(12) United States Patent
Wannier et al.

(10) Patent No.: US 7,398,133 B2
(45) Date of Patent: Jul. 8, 2008

(54) MATCHING THE FIT OF INDIVIDUAL GARMENTS TO INDIVIDUAL CONSUMERS

(75) Inventors: Louise J. Wannier, Pasadena, CA (US); James P. Lambert, Toluca Lake, CA (US)

(73) Assignee: myShape, Inc., Pasadena, CA (US)

( * ) Notice: Subject to any disclaimer, the term of this patent is extended or adjusted under 35 U.S.C. 154(b) by 100 days.

(21) Appl. No.: 11/412,321

(22) Filed: Apr. 26, 2006

(65) Prior Publication Data

US 2006/0287877 A1    Dec. 21, 2006

Related U.S. Application Data

(60) Provisional application No. 60/779,300, filed on Mar. 6, 2006, provisional application No. 60/676,678, filed on Apr. 27, 2005.

(51) Int. Cl.
  *G06F 19/00* (2006.01)
(52) U.S. Cl. .......................... 700/132; 700/130; 705/26
(58) Field of Classification Search ................ 700/130, 700/131, 132, 135; 705/1, 26; 707/3, 4, 707/6, 104.1
See application file for complete search history.

(56) References Cited

U.S. PATENT DOCUMENTS

| | | |
|---|---|---|
| 2,665,040 A | 1/1954 | Reid |
| 2,690,844 A | 10/1954 | Torrance |
| 3,058,599 A | 10/1962 | Brylski |
| 3,102,639 A | 9/1963 | Hightower |
| 4,149,246 A | 4/1979 | Goldman |
| 4,486,774 A | 12/1984 | Maloomian |
| 4,539,585 A | 9/1985 | Spackova et al. |
| 4,739,911 A | 4/1988 | Quinn |
| 5,163,007 A | 11/1992 | Slilaty |
| 5,441,414 A | 8/1995 | Chretien |
| 5,495,568 A | 2/1996 | Beavin |
| 5,515,248 A | 5/1996 | Canfield et al. |
| 5,530,652 A * | 6/1996 | Croyle et al. ................. 700/130 |
| 5,551,021 A | 8/1996 | Harada et al. |
| 5,553,277 A | 9/1996 | Hirano et al. |
| 5,680,528 A | 10/1997 | Korszun |
| 5,724,522 A | 3/1998 | Kagami et al. |
| 5,757,661 A * | 5/1998 | Surville ....................... 702/155 |
| 5,850,222 A | 12/1998 | Cone |
| 5,930,769 A * | 7/1999 | Rose ............................ 705/27 |
| 5,937,081 A | 8/1999 | O'Brill et al. |
| 5,937,232 A | 8/1999 | Taguchi et al. |
| 5,956,525 A * | 9/1999 | Minsky ......................... 396/3 |

(Continued)

*Primary Examiner*—Gary L. Welch
*Assistant Examiner*—Nathan E Durham
(74) *Attorney, Agent, or Firm*—Philip H. Albert; Townsend and Townsend and and Crew, LLP

(57) ABSTRACT

A method and system for specifying the fit of garments and matching the fit of individual garments to individual consumers is disclosed. In one embodiment, a method includes categorizing human body shapes based on dimensional and demographic body measurement data sampled from the human population, and statistically analyzing the measurement data to determine the appropriate number of discrete body shapes, as well as the range of measurement values characteristic of each body shape. The method includes assigning to each body shape a shape code, which is a unique name and/or symbol and/or curve representing that shape. In one embodiment, a recommendation engine is employed to specify and match the fit of individual garments to individual consumers.

13 Claims, 14 Drawing Sheets

U.S. PATENT DOCUMENTS

| | | |
|---|---|---|
| 5,970,471 A | 10/1999 | Hill |
| 5,974,400 A | 10/1999 | Kagami et al. |
| 6,012,619 A | 1/2000 | Lam |
| 6,067,526 A | 5/2000 | Powell |
| 6,101,424 A * | 8/2000 | Sawada ............... 700/136 |
| 6,353,770 B1 * | 3/2002 | Ramsey et al. ........ 700/131 |
| 6,546,309 B1 * | 4/2003 | Gazzuolo ............. 700/132 |
| 6,665,577 B2 * | 12/2003 | Onyshkevych et al. .... 700/130 |
| 6,711,455 B1 * | 3/2004 | Holloway et al. ........ 700/132 |
| 6,813,838 B2 * | 11/2004 | McCormick ............ 33/17 R |
| 6,831,603 B2 | 12/2004 | Menache |
| 6,865,430 B1 | 3/2005 | Runton |
| 6,968,075 B1 * | 11/2005 | Chang ................ 382/111 |
| 7,020,538 B2 * | 3/2006 | Luhnow ............... 700/132 |
| 7,092,782 B2 * | 8/2006 | Lee ................... 700/132 |
| 7,149,665 B2 * | 12/2006 | Feld et al. ............ 703/2 |
| 7,194,327 B2 | 3/2007 | Lam |
| 2002/0004763 A1 | 1/2002 | Lam |
| 2002/0103566 A1 * | 8/2002 | Gadson ............... 700/132 |
| 2002/0138170 A1 * | 9/2002 | Onyshkevych et al. ... 700/130 |
| 2002/0178072 A1 | 11/2002 | Guster et al. |
| 2002/0188372 A1 * | 12/2002 | Lane et al. ........... 700/130 |
| 2004/0083142 A1 * | 4/2004 | Kozzinn .............. 705/27 |
| 2004/0186611 A1 * | 9/2004 | Wang ................. 700/132 |
| 2005/0022708 A1 | 2/2005 | Lee |
| 2005/0080505 A1 * | 4/2005 | Luhnow ............... 700/132 |
| 2006/0031128 A1 * | 2/2006 | Lamitie .............. 705/26 |
| 2006/0059054 A1 * | 3/2006 | Adiseshan ............ 705/26 |
| 2006/0218045 A1 * | 9/2006 | Wagner ............... 705/26 |

* cited by examiner

Categorization Process (110)

Circumference Measurements

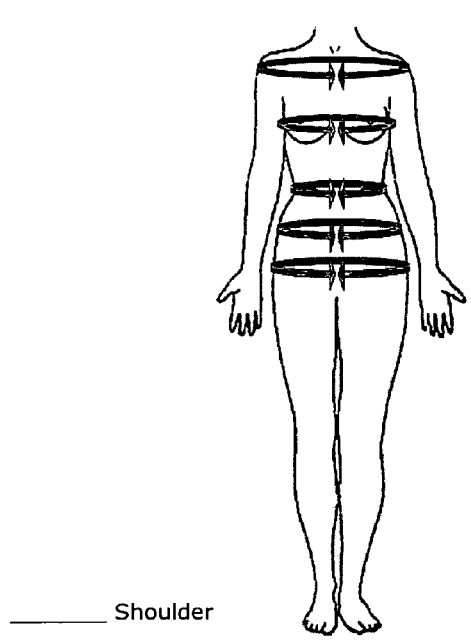

_____ Shoulder

_____ Bust

_____ Waist

_____ High Hips

_____ Hips

- Shoulders: Measure around shoulders, just below the shoulder joint, going outside your arms at the widest point.

- Bust: Measure bust at fullest point and straight across back.

- Waist: Measure around torso at your waistline.

- High Hips: Measure over top of hip bones, 2" -4" below waist.

- Hips: Measure at the fullest part, usually 7" – 9" from waist.

FIG. 3A

Front Measurements

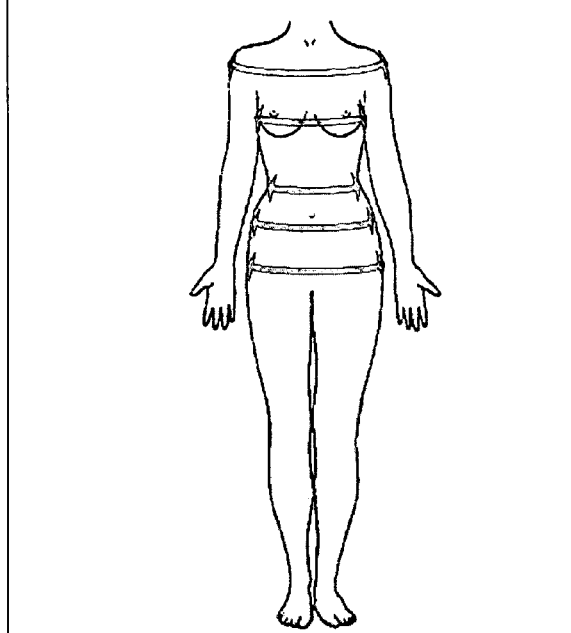

_____ Shoulder
_____ Bust
_____ Waist
_____ High Hips
_____ Hips

Measure the FRONT OF YOU from the middle of one side to the middle of the other only. (It helps if you are wearing lightweight, form fitting clothes with side seams to help locate the side of your body.)

- Front of Shoulders: Measure from mid point of upper arm just below the shoulder joint to the same point of the opposite side, crossing in front of your body.
- Front of Bust: Measure from as close to middle of one side of your body to the middle of the other crossing over the fullest part of your bust.
- Front of Waist: Measure from middle of one side to the middle of the other at your waist.
- Front of High Hips: Measure over top of hip bones, 2" -4" below waist.
- Front of Hips: Measure from the middle of one side to the middle of the other at the fullest part of your hips, usually 7 9 from waist.

FIG. 3B

Height Measurements

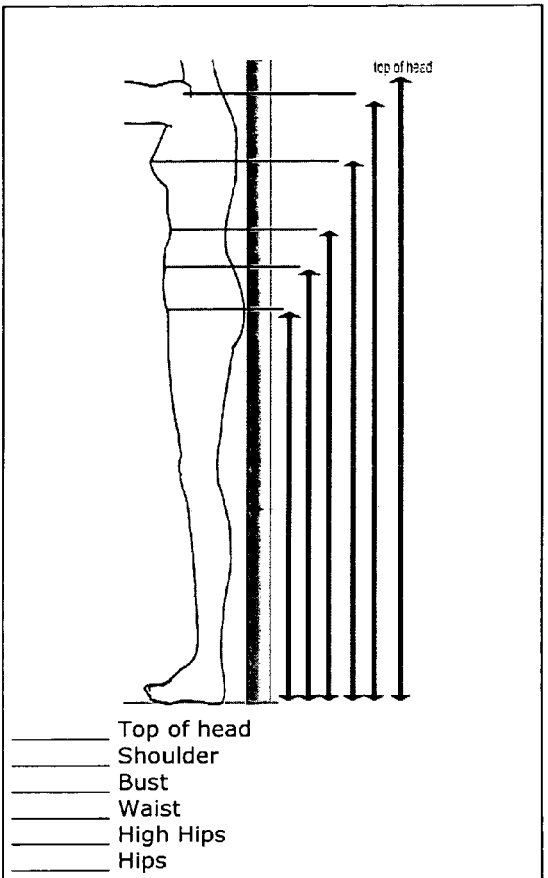

___ Top of head
___ Shoulder
___ Bust
___ Waist
___ High Hips
___ Hips

Measure the HEIGHT of the following by taping or attaching a measuring tape to a corner of a wall or doorway to measure the heights. A book, ruler or straight edge can help. This will give a vertical silhouette.
- Top of head to floor: Stand up against the tape on the wall and measure from the top of your head to the floor.
- Shoulder to floor: Up against the tape on the wall, measure from the top of your shoulder joint to the floor.
- Bust to floor: Up against the tape on the wall, measure from the fullest point of your bust to the floor.
- Waist to floor: Up against the tape on the wall, measure from waistline to the floor.

Hips to floor: Stand against the tape and measure from the fullest point of your hips to the floor.

FIG. 3C

Length Measurements

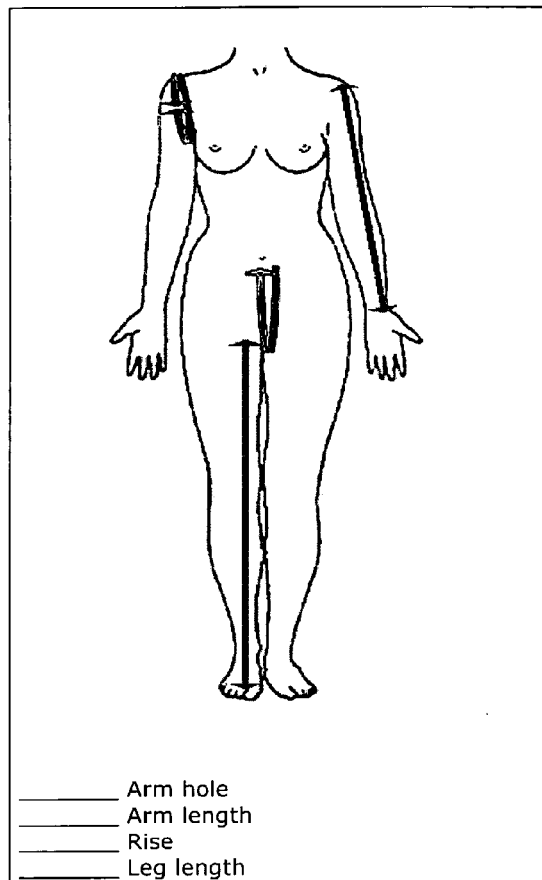

___ Arm hole
___ Arm length
___ Rise
___ Leg length

Measure the ARM LENGTH and LEG LENGTH (inseam)
- Arm hole size: Measure top of shoulder under arm and back around to the top of the arm.
- Arm length: Measure from the middle of the shoulder joint to the wrist joint.
- Rise (of pants): Start at middle of your waist in back, pass tape measure between your legs and up to the middle of your waist in front. Do not pull tight on this measurement, and don't make it too loose. Keep comfort in mind and make sure you are measuring your body accurately.

Leg length (inseam): Measure from the crotch to the floor on the inside of your leg.

FIG. 3D

Match Assessment for a fitted dress

Example Result:

| | 1 | | 2 | | 3 | | 4 | | 5 | | 6 | | 7 | |
|---|---|---|---|---|---|---|---|---|---|---|---|---|---|---|
| BEST | 235 | 0 | 7374 | 0 | 3566 | 4 | 23 | 0 | 1001 | 0 | 96 | 1 | 1065 | 0 |
| | 1098 | 0 | 5633 | 0 | 4123 | 4 | 776 | 0 | 76 | 0 | 112 | 1 | 3676 | 2 |
| | 4567 | 0 | 876 | 1 | 7234 | 8 | 4321 | 0 | 2467 | 0 | 3989 | 1 | 53 | 6 |
| | 986 | 0 | 278 | 2 | 9875 | 8 | 706 | 0 | 9009 | 5 | 5155 | 1 | 342 | 6 |
| | 916 | 0 | 9998 | 2 | 8887 | 8 | 4997 | 0 | 3421 | 5 | 6341 | 1 | 4088 | 6 |
| | 671 | 3 | 6543 | 6 | 4309 | 9 | 2156 | 3 | 6540 | 8 | 6340 | 2 | 5115 | 6 |
| | 9643 | 3 | 2345 | 6 | 1280 | 9 | 223 | 3 | 6669 | 8 | 6342 | 2 | 7689 | 7 |
| | 1102 | 5 | 1234 | 6 | 478 | 12 | 986 | 5 | 848 | 9 | 7867 | 2 | 4024 | 7 |
| | 234 | 6 | 785 | 7 | 978 | 12 | 4044 | 6 | 959 | 9 | 7543 | 4 | 8309 | 9 |
| | 1098 | 7 | 9008 | 7 | 5111 | 15 | 2776 | 7 | 595 | 9 | 426 | 4 | 4706 | 9 |
| | 5278 | 8 | 8009 | 7 | 2390 | 16 | 5123 | 8 | 334 | 9 | 13 | 6 | 5182 | 9 |
| | 9754 | 8 | 3123 | 8 | 7776 | 18 | 4356 | 8 | 2313 | 9 | 2347 | 6 | 9439 | 9 |
| | 445 | 8 | 846 | 9 | 32 | 28 | 6690 | 8 | 8889 | 9 | 354 | 8 | 176 | 9 |

*Garment ID*

*Ranking code*

Shape Bins with prioritized garments
544

FIG. 5G

MATCHING THE FIT OF INDIVIDUAL GARMENTS TO INDIVIDUAL CONSUMERS

RELATED APPLICATIONS

This application claims the benefit of U.S. Provisional Patent Application No. 60/676,678, filed Apr. 27, 2005, entitled "A Method For Specifying The Fit Of Garments And Matching The Fit Of Individual Garments To Individual Consumers Based On A Recommendation Engine", and to U.S. Provisional Patent Application No. 60/779,300, filed Mar. 6, 2006, entitled "Method of specifying the fit of garments and matching the fit of individual garments to individual consumers based on a recommendation engine (combining measurements, preferences and body shape algorithm)", which are hereby incorporated by reference in their entirety.

BACKGROUND

The present invention relates generally to the fields of apparel manufacture and sales, data processing, and in particular to a method and system for specifying the fit of garments for individuals.

A 1999 study by Kurt Salmon Associates reported that 62% of U.S. consumers are very dissatisfied with the fit of their apparel. Ill-fitting garments do not sell and are often returned when they do sell. Most of the 40% return rate for women's clothing sold in the U.S. is due to size and fit problems.

One cause of fit problems is a lack of standards. The U.S. Department of Commerce withdrew the commercial standard for the sizing of women's apparel on Jan. 20, 1983. Since then, clothing manufacturers and retailers have repeatedly redefined the previous standards or invented their own proprietary sizing schemes. The garment size for an individual often differs from one brand of apparel to another. This is commonly seen with women's clothing. A dress labeled 'size 10' from one manufacturer fits differently than a size 10 from another manufacturer. One may fit well, the other not at all. Consumers must try on each and every garment before buying. Even within a single size from a single manufacturer there can be fit problems because of the wide variation in consumers' body shapes.

Thus, the lack of sizing standards combined with unreliable labeling cause apparel fit problems, which in turn cause a very high rate of apparel returns, lost sales, brand dissatisfaction, time wasted in fitting rooms, and intense consumer frustration.

There is therefore a need for a method and system that is easy to use, and effective in helping individuals find apparel that fits their body shape and lifestyle.

BRIEF SUMMARY

Accordingly, there is a need for a method and system to more accurately specify the fit of garments and to match well-fitting garments with individual consumers, thereby addressing the shortcomings noted above. The present invention provides a fit specification method for specifying the fit of garments and matching the fit of individual garments to individual consumers based on a recommendation engine. The fit specification method consists of three processes: categorization, match assessment, and personalized shopping. The categorization process categorizes human bodies by shape, assigning a shape code to each general body shape.

In one embodiment there are seven body shapes represented by shape codes numbered 1 through 7. The categorization process also categorizes individual garments by body shape, assigning each garment a corresponding shape code or codes. Additionally, a method is provided to collect a garment profile, which is data describing an individual garment. A garment is then assigned a fit code, which is a combination of its garment profile and its shape code. A garment's fit code may be stored in databases, printed on the garment's labels, embedded in radio frequency identification (RFID) tags, etc.

The categorization process also categorizes individual consumers by body shape, assigning each consumer a corresponding shape code. Additionally, a means is provided to collect a consumer profile, which is data describing an individual consumer and her clothing preferences. A consumer is then assigned a fit code, which is a combination of her consumer profile and her shape code.

Thus, armed with knowledge of her body's shape code, the consumer can compare her shape code with a garment's shape code to more accurately predict the likelihood of a proper fit. The consumer may further improve the likelihood of a proper fit by using the match assessment process, which compares her fit code to the garment's fit code. The match assessment process automatically matches an individual consumer's fit code with the fit codes of one or many garments, while the recommendation engine produces ranked listings of matching garments for presentation to the consumer.

The fit specification method includes a personalized shopping process that offers consumers individually customized shopping environments, which may be implemented in online and/or offline retail settings. Through her personalized shopping environment the consumer may access the categorization and match assessment processes and be presented with recommended garments that she can trust will fit her body and suit her clothing preferences.

A better understanding of the nature and advantages of the present invention can be gained from the following detailed description and the accompanying drawings.

BRIEF DESCRIPTION OF THE DRAWINGS

FIGS. 3A-3B illustrate circumference and front measurement techniques, in accordance with embodiments of the invention;

FIG. 3C-D illustrate height and length measurement techniques, in accordance with embodiments of the invention;

FIGS. 5A-5G are flowcharts illustrating a match assessment process for a fitted dress, in accordance with embodiments of the invention;

These and other embodiments of the invention are described in further detail below.

DESCRIPTION OF EXEMPLARY EMBODIMENTS

Embodiments of the invention are directed to a system and method for matching the fit of garments to individuals. In one embodiment, a user submits a plurality of measurements and lifestyle data to an analysis engine to develop a fit profile. The analysis engine process the plurality of measurements and lifestyle data to match the fit of a plurality of garments. The user's fit profile is categorized and a fit profile code is given to the user that represents their fit profile. In one embodiment, clothing manufactures, retail outlets, and the like, label their garments according to fit profile codes based on each garments measurements. The consumer compares their fit profile code to the garment's fit profile codes to find garments that match their fit profile.

Throughout this description, the embodiments and examples shown should be considered as exemplar rather than limitations of the present invention. In describing embodiments of the invention, female consumers and women's apparel will serve as examples and for the sake of clarity. However, the invention is not intended to be limited women's apparel as the invention may be used for various types of apparel including men's and children's apparel.

Fit Specification Process

Figure 1:
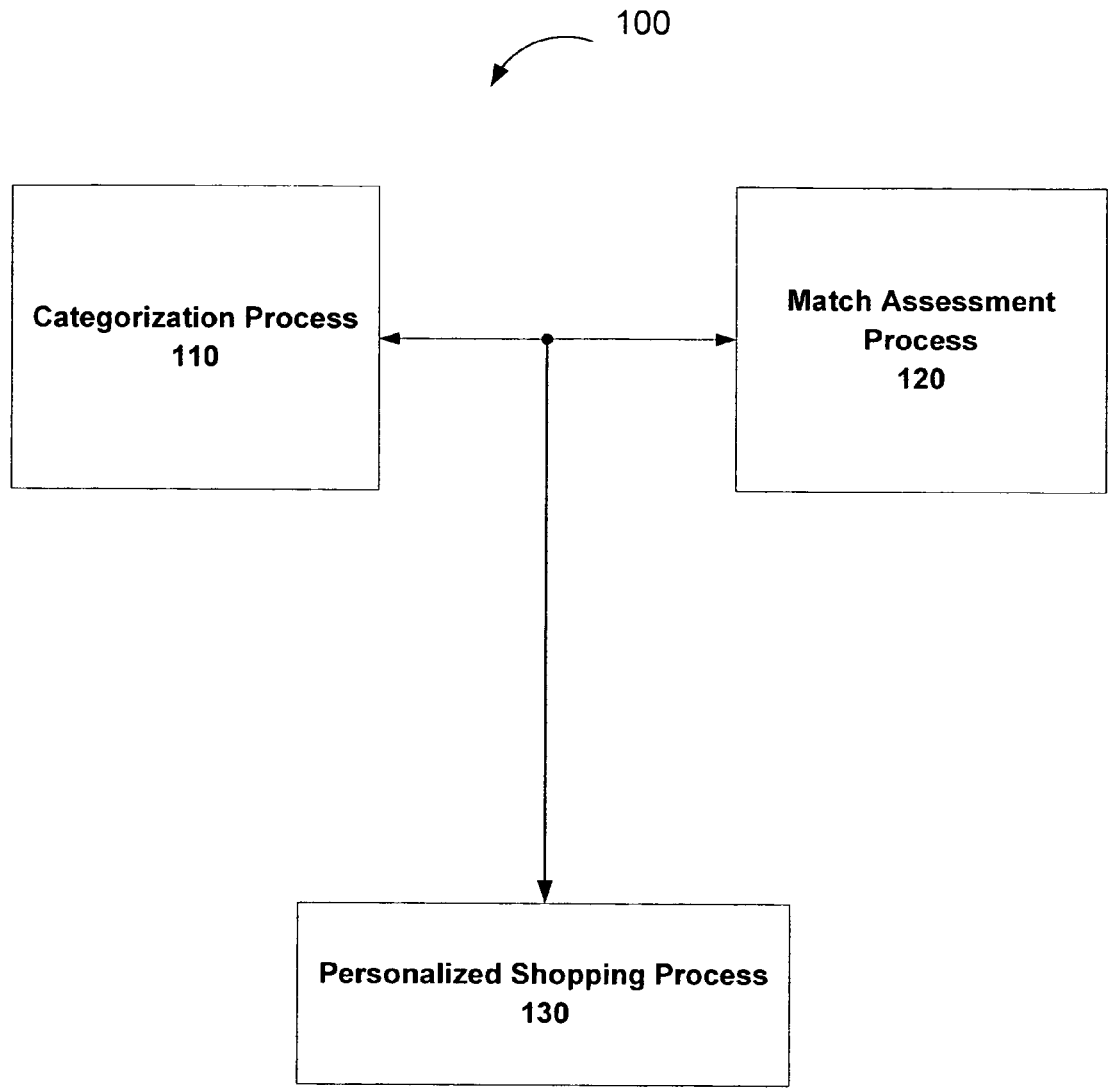
FIG. 1 is a simplified block diagram of a fit specification method, in accordance with embodiments of the invention.

FIG. 1 is a simplified block-diagram depicting a fit specification process 100 described herein and its constituent processes: a categorization process 110, a match assessment process 120, and a personalized shopping process 130, described herein. The processes are interdependent, sharing inputs and outputs. Categorization process 110 categorizes human body shapes into a set of shapes (represented by shape codes 1 through 7 in this embodiment.) Categorization process 110 also assigns both shape and fit codes to individual consumers and individual garments. Given an individual consumer's shape and fit codes, the match assessment process 120 calculates a ranked listing of recommended garments likely to fit that consumer. Personalized shopping process 130 provides a means for consumers to access a fit specification system via a customized shopping environment, as described further below. Thus, specification process 100 may be described as locating a person in an N-dimensional person space, P, based on their shape, measurements, etc., locate a garment in an N-dimensional garment space, G, repeat this for all the persons and all the garments, to generate a mapping of people and garments, f: P—>G.

Categorization Process

Figure 2A:
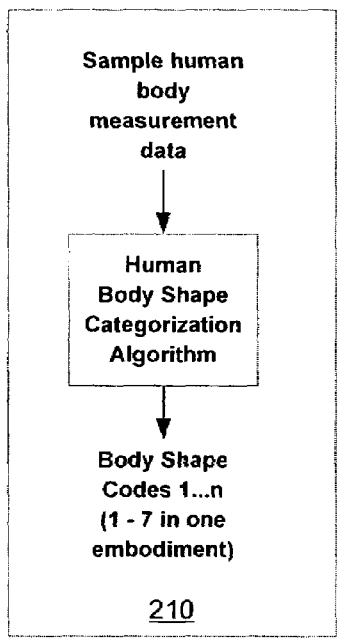
FIGS. 2A-C are simplified block diagrams illustrating a categorization process, in accordance with embodiments of the invention.
Figure 2B:
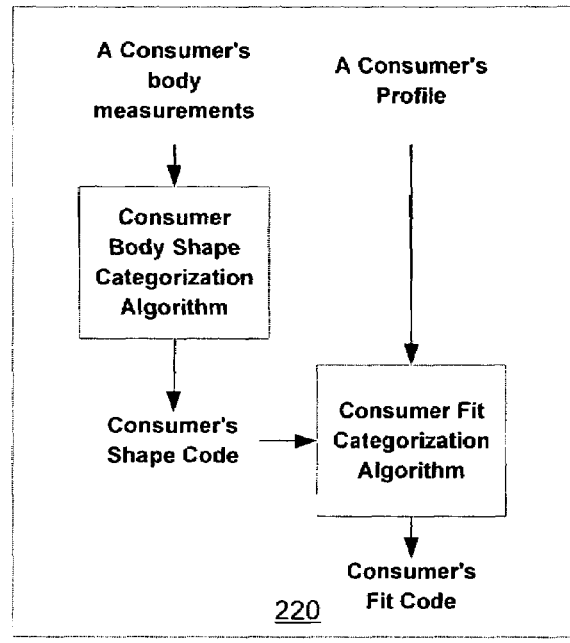
Figure 2C:
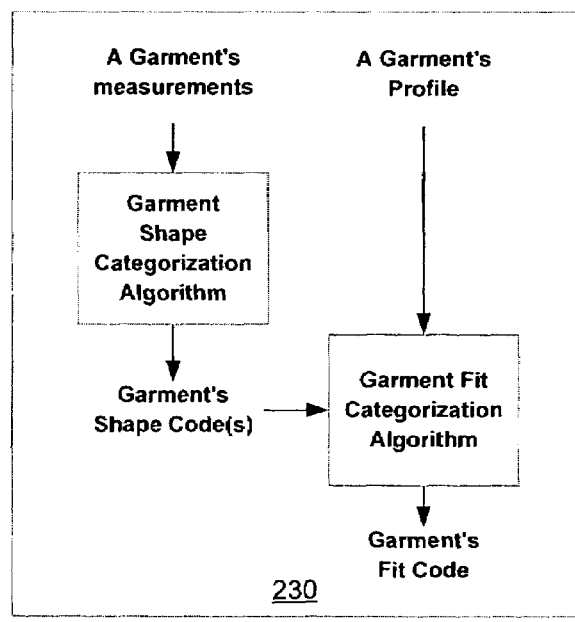

FIGS. 2A-2C depict categorization process 110. In one embodiment, categorization process 110 includes an engine 210 that defines human body shapes as shape codes, an engine 220 that categorizes individual consumers by shape and fit code, and an engine 230 categorizes individual garments by shape and fit codes.

Define Human Body Shapes

FIG. 2A illustrates engine 210 for defining human body shapes. In one embodiment, engine 210 determines a list of critical measurements of the human body. Table 1 lists twenty-one such measurements as used in one embodiment of the present invention.

TABLE 1

| BODY MEASUREMENTS | | |
|---|---|---|
| 1 | C | Shoulder Circumference |
| 2 | C | Bust Circumference |
| 3 | C | Waist Circumference |
| 4 | C | High Hip Circumference |
| 5 | C | Hip Circumference |
| 6 | F | Front/Back Shoulder to Shoulder |
| 7 | F | Front/back Bust |
| 8 | F | Front/back Waist |

TABLE 1-continued

| BODY MEASUREMENTS | | |
|---|---|---|
| 9 | F | Front/back High Hip 4" below waist |
| 10 | F | Front/back Hip 9" below waist or widest point |
| 11 | H | Height: Top of Head |
| 12 | H | Height: Shoulders |
| 13 | H | Height: Bust |
| 14 | H | Height: Waist |
| 15 | H | Height: High Hips |
| 16 | H | Height: Hips |
| 17 | H | Height: Knee |
| 18 | D | Total Rise |
| 19 | D | Armhole Circumference |
| 20 | D | Inseam |
| 21 | D | Arm |

FIGS. 3A-3D depict the positions and techniques for acquiring such body measurements. In one embodiment, engine 210 uses a human body shape categorization algorithm, which is a series of calculations that establish arithmetic and/or geometric relationships between the different body measurements is employed to generate a profile of a user. Such human body shape categorization algorithm consider the front and side profiles in 2 and 3 dimensions for each measurement and evaluate the relative proportions of certain points on the torso including, but not limited to: the proportion of the shoulders to the hips, the shoulders to the bust, the bust to the waist, the waist to the hip, the proportion of the body mass that is in the front bisection of the body, etc. For example, two of the calculations of the human body shape categorization algorithm are:

Shoulder Circumference minus Hip Circumference, i.e.

$$1C-5C=\text{Value1}$$

Bust Circumference minus Front Bust divided by the Bust Circumference, i.e.

$$(2C-7F)/2C=\text{Value6}$$

Table 1A lists thirteen such calculations as used in one embodiment of the present invention.

TABLE 1A

| Body Shape Categorization Algorithm Calculations |
|---|
| 1C − 5C = Value1 |
| 2C − 3C = Value2 |
| 2C − 5C = Value3 |
| 5C − 3C = Value4 |
| (1C − 7F)/1C = Value5 |
| (2C − 7F)/2C = Value6 |
| (3C − 8F)/3C = Value7 |
| (4C − 10F)/4C = Value8 |
| (5C − 10F)/5C = Value9 |
| 12H − 16H = Value10 |
| 13H − 14H = Value11 |
| 16H − 14H = Value12 |
| 16H − 17H = Value13 |

Referring to FIG. 2A, engine 210 processes body measurements from representative samples of the human population and sub-populations (e.g., U.S. women aged 40-65). In one embodiment, engine 210 processes the sample using the human body shape categorization algorithm. Engine 210 statistically analyzes the results to discern clustered subsets within the population, each sharing common data values. In one embodiment there are seven such subsets named body shape 1 to 7. Each body shape is defined by a core set of measurement values together with an acceptable range of deviation from the mean for each value. Thus, having been defined, these seven body shapes may then be assigned to individual consumers and garments as Shape Codes 1 to 7.

Categorize Individual Consumers.

In one embodiment, engine 220 receives an individual consumer's body measurements such as those listed in Table 1 and FIGS. 3A-D, inputs that data into a consumer body shape categorization algorithm. The consumer body shape categorization algorithm may be implemented using a variety of techniques. For example, the consumer body shape categorization algorithm may be implemented using a series of calculations that establish arithmetic and/or geometric relationships between the different body measurements. These calculations closely follow the transforms of the human body shape categorization algorithm described above, but also include a best-fit analysis to determine which body shape the consumer most closely matches. The consumer may then be assigned a corresponding shape code.

In another embodiment, a shape code may be determined using the three-dimensional (3-D) lines of the body's measurements and relative proportions of height and girth of shoulders, bust, waist, high hips and hips and knee. Such 3-D measurements may be used to determine a curve for the shape of the body in 3-D. The 3-D measurements of the body may be correlated to the curves of the garment and/or combination of garments that represent an outfit in 3-D. A comparison of the two 3-D measurements may be used to determine a body shape code geometrically.

FIG. 2B illustrates one embodiment of engine 220 to generate a consumer's fit code using a consumer body measurements and consumer profiles. In one embodiment, engine 220 collects a consumer's profile, which is data describing an individual consumer and her clothing preferences. For example, Table 2 lists thirty-three such data points as used in one embodiment of the present invention.

TABLE 2

Consumer Profile Data

| 1000 | C | Customer Service (Codes) |
|---|---|---|
| 1001 | D | Shoulder Tolerance |
| 1002 | D | Bust Tolerance |
| 1003 | D | Waist Tolerance |
| 1004 | D | Hip Tolerance |
| 1005 | D | Color Palette |
| 1006 | D | Styles Desired (Romantic, Dramatic, etc.) |
| 1007 | D | Fabrics Desired (codes) |
| 1008 | D | Brands/Designers I buy (codes) |
| 1009 | D | Brands/Designers I like (codes) |
| 1010 | D | I find it difficult to find (pants, outfits, dresses, skirts, tops) |
| 1011 | D | Normally I wear (petite, regular, tall) |
| 1012 | D | Normally I buy size (codes) |
| 1013 | D | I usually spend amount per outfit (codes) |
| 1014 | D | I wear my pants (at waist, 1" below, very much below) |
| 1015 | D | I usually shop (codes) |
| 1016 | D | I buy on sale (always, sometimes, occasionally) |
| 1017 | D | % of purchases online |
| 1018 | D | I have returned (codes) |
| 1019 | D | I usually spend per shop (codes) |
| 1020 | D | I get my news from (codes) |
| 1021 | D | I get my fashion news from (codes) |
| 1022 | D | My favorite websites (list) |
| 1023 | D | Associations I belong to (codes) |
| 1024 | D | My hobbies (codes) |
| 1025 | D | I volunteer |
| 1026 | D | I meditate |
| 1027 | D | I enjoy sports (codes) |
| 1028 | D | Music I prefer (codes) |
| 1029 | D | Homeowner (codes) |
| 1030 | D | Car I drive (codes) |
| 1031 | D | My children (codes) |
| 1032 | D | My household income (codes) |

As illustrated in FIG. 2B, engine 220 employs a consumer fit categorization algorithm to process the consumer profile data. The consumer fit categorization algorithm encodes each of the data points according to the type of data represented. For example, Bust Tolerance (1002D) is a numeric value; homeowner (1029D) is a Boolean value; while 'Brands I buy' (1008D) is an alphanumeric value derived from a lookup table of popular brands. Once encoded, the data points are concatenated and combined with the consumer's shape code. In one embodiment, the resultant value is essentially the consumer's measurement and profile record, and may be represented as a single compressed and encrypted alphanumeric string, which is the consumer's fit code.

Categorize Individual Garments.

FIG. 2C illustrates an embodiment of engine 230 employed to process garment shape codes and garments profile to generate a garment's fit code. In one embodiment, engine 230 receives an individual garment's measurements. Table 3 lists thirty-five such measurements as used in one embodiment of the present invention.

TABLE 3

Garment Measurements

| 1 | C | Shoulder Circumference |
|---|---|---|
| 2 | C | Bust Circumference |
| 3 | C | Waist Circumference |
| 4 | C | High Hip Circumference |
| 5 | C | Hip Circumference |
| 6 | F | Front/Back Shoulder to Shoulder |
| 7 | F | Front/back Bust |
| 8 | F | Front/back Waist |
| 9 | F | Front/back High Hip 4" below waist |
| 10 | F | Front/back Hip 9" below waist or widest point |
| 11 | H | Height: Shoulder to Bust |
| 12 | H | Height: Shoulder to Waist |
| 13 | H | Height: Shoulder to High Hip |
| 14 | H | Height: Shoulder to Hip |
| 15 | H | Height: Shoulder to Hem |
| 16 | H | Height: Waist to Hem (CALCULATED) |
| 17 | H | Height: Center Front to Hem |
| 18 | H | Height: Center Back to Hem |
| 19 | H | Outseam |
| 20 | D | Total Rise |
| 21 | D | Armhole Circumference |
| 22 | D | Inseam |
| 23 | D | Sleeve Length |
| 24 | D | Neck to Shoulder |
| 25 | D | Front Rise |
| 26 | D | Thigh Circumference |
| 27 | D | Bottom of Leg Circumference |
| 28 | D | Shoulder Tolerance |
| 29 | D | Bust Tolerance |
| 30 | D | Waist Tolerance |
| 31 | D | High Hip Tolerance |
| 32 | D | Hip Tolerance |
| 33 | D | Desired Garment Length (above knee, at knee, below knee, mid-calf, floor) |
| 34 | D | Desired Sleeve Tolerance |
| 35 | D | Desired Armhole Tolerance |

Referring to FIG. 2C, engine 230 employs a garment shape categorization algorithm to process the garment measurement data. In one embodiment, the garment shape categorization algorithm may be a series of calculations that establish arithmetic and/or geometric relationships (expressed as curves) between the various garment measurements. For different garment types there are different critical measurements. For example, a dress will have different measurement points than a jacket or pants. These measurements may be taken from the pattern guide, or be imported from the CAD representation in the manufacturer's cutting system, or manually from the garment itself. To derive a matching shape code, engine 230 compares the garment's curves, derived from the measurements, to the curves represented by each of the seven body shapes to determine whether the garment is suitable for one or more body shape. The curves are compared in front, side and back profiles. As stated above, the curves may also be compared three-dimensionally (i.e., 3-D) with the volume of the front half of a body shape being compared with the volume of the front half of the garment. Once, matching curves are found, the garment is assigned its matching shape code(s).

Engine 230 processes the garment's profile. The garment's profile is data describing an individual garment. Table 4 lists an example of twenty-three such data points as used in one embodiment of the present invention.

TABLE 4

Garment Profile Data

| | | |
|---|---|---|
| 101 | C | FIT (1 = snug 1B, 1W, 1H; 2 = fitted 2B, 2W, 2H; 3 = loose 3B, 3W, 3H) |
| 102 | D | Garment Type |
| 103 | D | Garment Type Code |
| 104 | D | Garment Descriptor |
| 105 | D | Description |
| 106 | D | Brand |
| 107 | D | Recommended Retail Price |
| 108 | D | Pocket (codes) |
| 109 | D | Collars and Yokes (codes) |
| 110 | D | Neckline (codes) |
| 111 | D | Fastening (zipper, button, hook, elastic) |
| 112 | D | Sleeve style (codes) |
| 113 | D | Leg Style |
| 114 | D | Skirt Style |
| 115 | D | Color |
| 116 | D | Origin (USA, CHINA, Europe, India, Other) |
| 117 | D | Use (career, casual, special occasion, etc.) |
| 118 | D | Style (romantic, dramatic, classic, artistic, basic, elegant, trendy, etc.) |
| 119 | D | Fabric (codes) |
| 120 | D | Care Instructions (wash, dry clean, other) |
| 121 | D | Manufacturer's Size |
| 122 | D | Outlier code (customer ID(s)) |
| 123 | D | Priority Code |

In one embodiment, engine 230 employs the garment fit categorization algorithm to process the garment profile data. The garment fit categorization algorithm functions similar to the consumer fit categorization algorithm described above to derive resultant values. The resultant value is the garment's measurement and profile record, represented as a single compressed and encrypted alphanumeric string, which is the garment's fit code.

The Match Assessment Process

Figure 4:
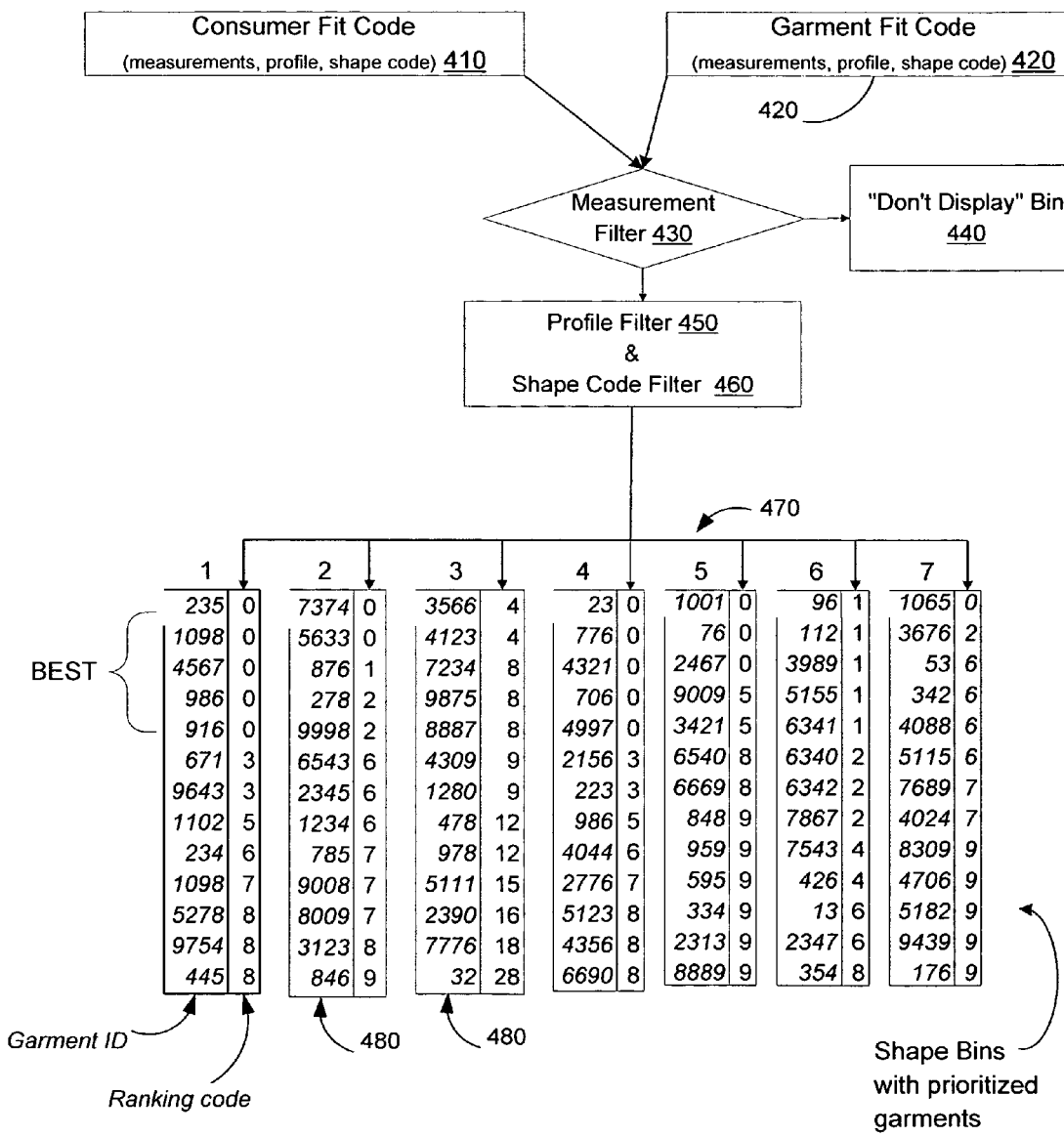
FIG. 4 is a simplified block diagram of the match assessment process, in accordance with embodiments of the invention.

FIG. 4 depicts match assessment process 120. In one embodiment, match assessment process 120 may be used to compare a consumer's fit code with a garment's fit code. As described herein, a fit code is an encapsulation of a plurality of a consumer's or a garment's attributes; i.e., measurements, profile, shape code(s). In one embodiment, the values of these six attributes (three from the consumer 410, three from the garment 420) are input to the match assessment process 120. The data is passed to three corresponding filters: measurement filter 430, profile filter 450, and shape code filter 460. The output of the filters is a ranked and sorted listing of those garments being assessed as illustrated in table 470. The sorting is composed of seven 'Holding Bins' 480—one for each shape in this embodiment, and a Bin D—'Don't Display" i.e., discard 440 garments that do not fit. Additionally, with each assessment a garment is temporarily assigned a priority code (123D). The priority code determines a garment's rank within its holding bin 480. This is most useful when a personal shopping process as described herein is occurring online, there the priority code will be used to determine the order in which matching garments are displayed to the consumer.

A garment's Type (102-104D) necessarily affects which data points are considered in an assessment, as well as their order of consideration. For example, while a jacket may have a shoulder circumference (1C), a pair of pants may not. Thus, the match assessment rules vary by garment type.

As an example of the rules and steps needed to conduct a match assessment, consider a consumer, Jane, and a fitted dress from designer Leona Edmiston. Table 5 lists the data that comprises Jane's fit code.

TABLE 5

Jane's Data

| Data Point | Data Type | Name | Example Value |
|---|---|---|---|
| Consumer ID | | | 1303 |
| Measurements | | | |
| 1 | C | Shoulder Circumference | 36.5 |
| 2 | C | Bust Circumference | 32 |
| 3 | C | Waist Circumference | 29 |
| 4 | C | High Hip Circumference | 32 |
| 5 | C | Hip Circumference | 35 |
| 6 | F | Front/Back Shoulder to Shoulder | 19 |
| 7 | F | Front/back Bust | 17 |
| 8 | F | Front/back Waist | 15.5 |
| 9 | F | Front/back High Hip 4" below waist | 17 |
| 10 | F | Front/back Hip 9" below waist or widest point | 19 |
| 11 | H | Height: Top of Head | 64 |
| 12 | H | Height: Shoulders | 53 |
| 13 | H | Height: Bust | 45.5 |
| 14 | H | Height: Waist | 39 |
| 15 | H | Height: High Hips | 37 |
| 16 | H | Height: Hips | 34 |
| 17 | H | Height: Knee | 17 |
| 18 | D | Total Rise | 28 |
| 19 | D | Armhole Circumference | 18 |
| 20 | D | Inseam | 30 |
| 21 | D | Arm | 20 |

TABLE 5-continued

Jane's Data

| Data Point | Data Type | Name | Example Value |
|---|---|---|---|
| | | Shape | |
| 100 | Calculated | ShapeCode(s) | 5 |
| | | Profile | |
| 1000 | C | Customer Service (Codes) | 512 - wants career wear |
| 1001 | D | Shoulder Tolerance | 1 |
| 1002 | D | Bust Tolerance | 2 |
| 1003 | D | Waist Tolerance | 1 |
| 1004 | D | Hip Tolerance | 4 |
| 1005 | D | Color Palette | red, yellow, brown |
| 1006 | D | Styles Desired (Romantic, Dramatic, etc.) | classic, elegant |
| 1007 | D | Fabrics Desired (codes) | cotton, wool, polyester, viscose, elastane |
| 1008 | D | Brands/Designers I buy (codes) | |
| 1009 | D | Brands/Designers I like (codes) | |
| 1010 | D | I find it difficult to find (pants, outfits, dresses, skirts, tops) | |
| 1011 | D | Normally I wear (petite, regular, tall) | |
| 1012 | D | Normally I buy size (codes) | 10 |
| 1013 | D | I usually spend amount per outfit (codes) | |
| 1014 | D | I wear my pants (at waist, 1" below, very much below) | |
| 1015 | D | I usually shop (codes) | |
| 1016 | D | I buy on sale (always, sometimes, occasionally) | |
| 1017 | D | % of purchases online | |
| 1018 | D | I have returned (codes) | |
| 1019 | D | I usually spend per shop (codes) | $400 |
| 1020 | D | I get my news from (codes) | |
| 1021 | D | I get my fashion news from (codes) | |
| 1022 | D | My favorite websites (list) | |
| 1023 | D | Associations I belong to (codes) | |
| 1024 | D | My hobbies (codes) | |
| 1025 | D | I volunteer | |
| 1026 | D | I meditate | |
| 1027 | D | I enjoy sports (codes) | |
| 1028 | D | Music I prefer (codes) | |
| 1029 | D | Homeowner (codes) | |
| 1030 | D | Car I drive (codes) | |
| 1031 | D | My children (codes) | |
| 1032 | D | My household income (codes) | |

Table 6 lists the data that comprises the dress' fit Code.

TABLE 6

Dress' Data

| Data Point | Data Type | Name | Example Value |
|---|---|---|---|
| Garment ID | | | G1001 |
| | | Measurements | |
| 1 | C | Shoulder Circumference | 37 |
| 2 | C | Bust Circumference | 34 |
| 3 | C | Waist Circumference | 30 |
| 4 | C | High Hip Circumference | 34 |
| 5 | C | Hip Circumference | 39 |
| 6 | F | Front/Back Shoulder to Shoulder | 18 |
| 7 | F | Front/back Bust | 17 |
| 8 | F | Front/back Waist | 15 |
| 9 | F | Front/back High Hip 4" below waist | 17.75 |
| 10 | F | Front/back Hip 9" below waist or widest point | 20.5 |
| 11 | H | Height: Shoulder to Bust | 9.5 |
| 12 | H | Height: Shoulder to Waist | 16.5 |
| 13 | H | Height: Shoulder to High Hip | 20.5 |
| 14 | H | Height: Shoulder to Hip | 25.5 |
| 15 | H | Height: Shoulder to Hem | 38.75 |
| 16 | H | Height: Waist to Hem (CALCULATED) | |
| 17 | H | Height: Center Front to Hem | 40 |
| 18 | H | Height: Center Back to Hem | |
| 19 | H | Outseam | |
| 20 | D | Total Rise | |

TABLE 6-continued

Dress' Data

| Data Point | Data Type | Name | Example Value |
|---|---|---|---|
| 21 | D | Armhole Circumference | 20 |
| 22 | D | Inseam | |
| 23 | D | Sleeve Length | 22.75 |
| 24 | D | Neck to Shoulder | |
| 25 | D | Front Rise | |
| 26 | D | Thigh Circumference | |
| 27 | D | Bottom of Leg Circumference | |
| 28 | D | Shoulder Tolerance | 2 |
| 29 | D | Bust Tolerance | 2 |
| 30 | D | Waist Tolerance | 1.25 |
| 31 | D | High Hip Tolerance | 2 |
| 32 | D | Hip Tolerance | 4 |
| 33 | D | Desired Garment Length (above knee, at knee, below knee, mid-calf, floor) | 0 (at knee) |
| 34 | D | Desired Sleeve Tolerance | 3 |
| 35 | D | Desired Armhole Tolerance | 2 |
| | | Shape | |
| 100 | Calculated | ShapeCode (s) | 1.5 |
| | | Profile | |
| 101 | C | FIT (1 = snug 1B, 1W, 1H; 2 = fitted 2B, 2W, 2H; 3 = loose 3B, 3W, 3H) | 2B, 2W |
| 102 | D | Garment Type | Dress |
| 103 | D | Garment Type Code | D1 |
| 104 | D | Garment Descriptor | Fitted |
| 105 | D | Description | Natasha', bust darts |
| 106 | D | Brand | Leona Edmiston |
| 107 | D | Recommended Retail Price | $375 |
| 108 | D | Pocket (codes) | 4 front pockets |
| 109 | D | Collars and Yokes (codes) | round |
| 110 | D | Neckline (codes) | crew/jewel |
| 111 | D | Fastening (zipper, button, hook, elastic) | side zipper |
| 112 | D | Sleeve style (codes) | long sleeves |
| 113 | D | Leg Style | ~ |
| 114 | D | Skirt Style | a-line |
| 115 | D | Color | chocolate brown |
| 116 | D | Origin (USA, CHINA, Europe, India, Other) | Australia |
| 117 | D | Use (career, casual, special occasion, etc.) | career |
| 118 | D | Style (romantic, dramatic, classic, artistic, basic, elegant, trendy, etc.) | classic |
| 119 | D | Fabric (codes) | 72% polyester 22% viscose, 6% elastane |
| 120 | D | Care Instructions (wash, dry clean, other) | hand wash do not tumble dry or dry clean |
| 121 | D | Manufacturer's Size | 1 |
| 122 | D | Outlier code (customer ID(s)) | |
| 123 | D | Priority Code | |

The Measurement Filter

As illustrated in FIG. 4, measurement filter 430 is employed to compare the measurements of a garment with those of a consumer as part of a measurement filter process.

Circumference Comparisons

Measurement filter 430 compares the circumference data points 1C through 5C for garment and consumer. For example, the following are compared: bust circumference (2C), waist circumference (3C), hip circumference (5C), shoulder circumference (1C), and finally high hip circumference (4C). For each data point the measurement filter 430 calculates the difference of the garment circumference Cg minus the consumer circumference Cc as illustrated in the following equation:

$$x = 1Cg - 1Cc$$

If the result (x) is greater than or equal to zero and less than or equal to the corresponding garment tolerance (28D through 32D), then measurement filter 430 processes the next data point, illustrated in the following equation:

If $(0 <= x <= 28Dg)$ then proceed to next data point

Otherwise, measurement filter 430 discards the current garment data into Bin D and proceeds to assess the next garment, if any. A flowchart 500A of these calculations is depicted in FIG. 5A.

Figure 5A:
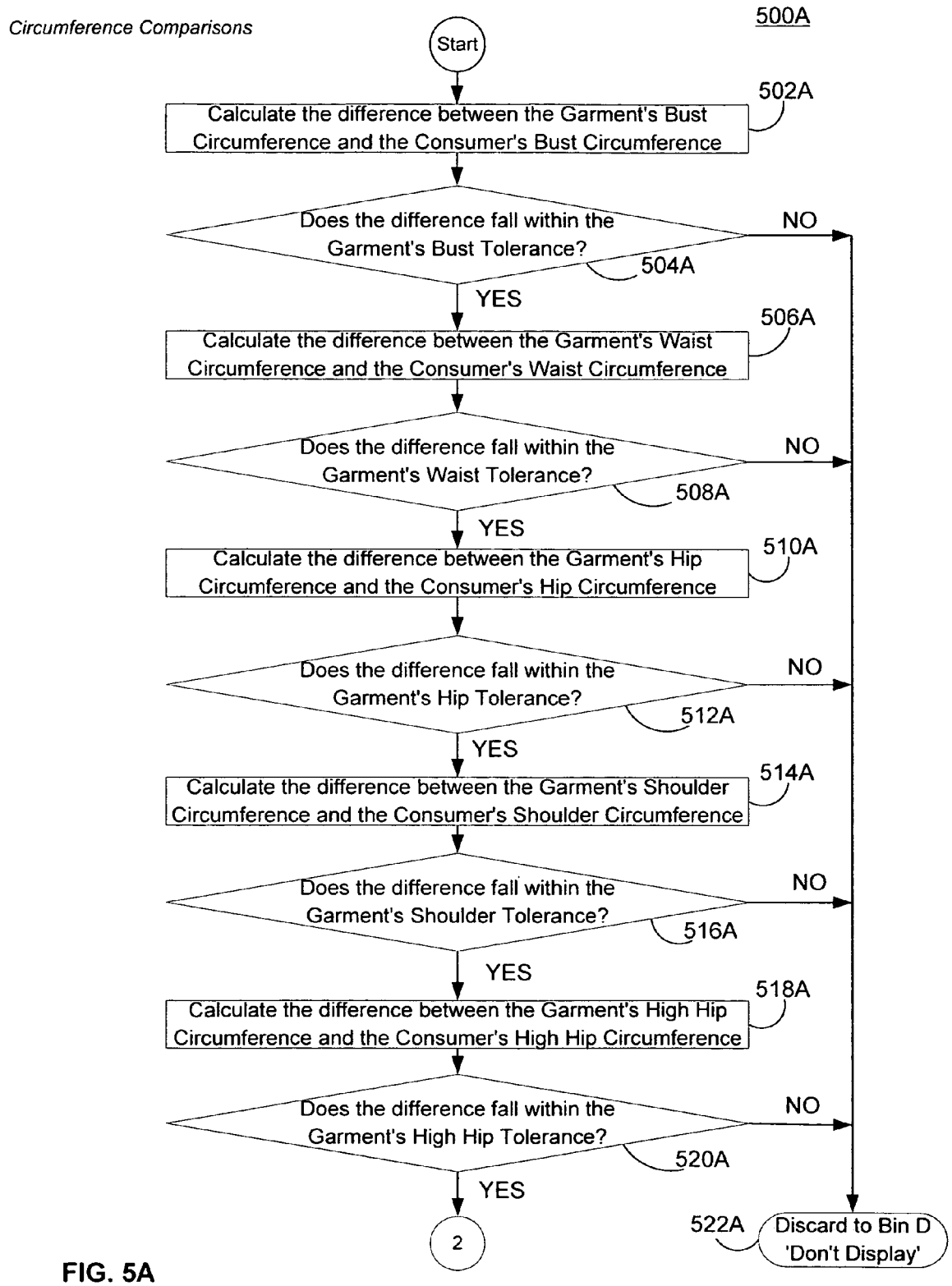

Referring to FIG. 5A and data in tables 5 and 6, the dress has a bust circumference (2C) of 34 and Jane's bust is 32. At step 502A, using the above equations:

$$34 - 32 = 2$$

At step 504A, 2 is more than zero and less than or equal to the dress' bust tolerance (29D):

$$0 <= 2 <= 2.$$

Therefore, a match is found at step 504A.

Measurement filter 430 processes the next data point—waist circumference (3C). At steps 506A and 508A, using the equations above:

$$30 - 29 = 1$$

$$0 <= 1 <= 1.25$$

a match is found at step 508A.

Measurement filter 430 processes the next data point—Hip Circumference (5C). At steps 510A and 512A, using the equations above:

$$39-35=4$$

$$0<=4<=4$$

a match is found at step 512A.

Measurement filter 430 processes the next data point—shoulder circumference (1C). At steps 514A and 516A, using the equations above:

$$37-36.5=0.5$$

$$0<=0.5<=2$$

a match is found at step 516A.

Measurement filter 430 processes the next data point—high hip circumference (4C). At steps 518A and 520A, using the equations above:

$$34-32=2$$

$$0<=2<=2$$

a match is found at step 520A.

Measurement filter 430 proceeds to calculate the front comparisons. If any of the above steps did not match, then at step 522A, the garment and/or data is discarded.

Front Comparisons

In one embodiment, measurement filter 430 compares the front data points 6F through 10F for garment and consumer. For each data point measurement filter 430 calculates the difference of the garment front minus the consumer front, using the following formula:

$$x=6Fg-6Fc$$

If the result (x) is greater than or equal to zero and less than or equal to the corresponding tolerance (28D through 32D) times consumer front Fg divided by the consumer circumference Fc (1C through 5C), measurement filter 430 then proceed to the next data point, which may be expressed by the following equation:

If $(0<=x<=28Dg*(6Fc/1Cc))$ then proceed to next data point

Otherwise, measurement filter 430 discards the current garment into Bin D and proceeds to assess the next garment, if any. A flowchart 500B of these calculations is depicted in FIG. 5B.

Figure 5B:
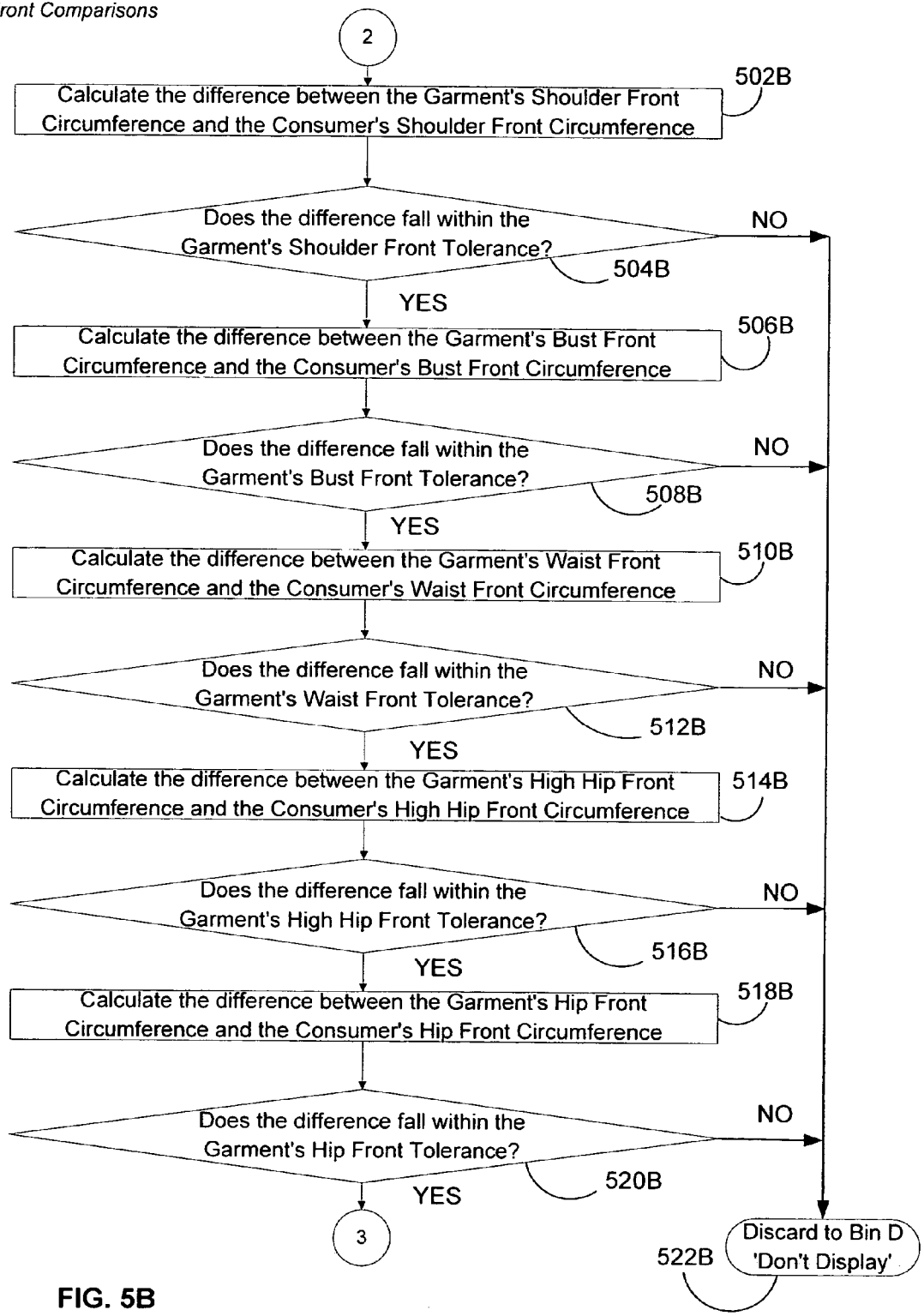

Referring to FIG. 5B and data in tables 5 and 6, the dress has a front shoulder (6F) of 19 and Jane's front shoulder is 18. At step 502B a difference is determined between the garment's shoulder front circumference and the consumer's shoulder front circumference, which when expressed by the above equation is:

$$19-18=1$$

At step 504B, as 1 is more than zero and less than or equal to the dress' shoulder tolerance (28D) times the consumer front shoulder (6F) divided by the consumer circumference (1C), illustrated by the following calculation:

$$0<=1<=2*(19/36.5)$$

a match is found at step 504B.

Measurement filter 430 proceeds to process the next data point—front bust (7F). At steps 506B and 508B, a difference is determined and evaluated between the garment's bust front circumference and the consumer's bust front circumference. For example, applying the equations above:

$$17-17=0$$

$$0<=0<=2*(17/32)$$

a match is found at step 508B.

Measurement filter 430 a proceeds to process the next data point—front waist (8F). At steps 510B and 512B, a difference is determined and evaluated between the garment's waist front circumference and the consumer's waist front circumference. For example, applying the equations above:

$$15.5-15=0.5$$

$$0<=0.5<=1.25*(16/29)$$

a match is found at step 512B.

Measurement filter 430 a proceeds to process the next data point—front high hip (9F). At steps 514B and 516B, a difference is determined and evaluated between the garment's high hip front circumference and the consumer's high hip front circumference. For example, applying the equations above:

$$17.75-17=0.75$$

$$0<=0.75<=2*(17/32)$$

A match is found at step 516B.

Measurement filter 430 a proceeds to process the next data point—front hip (10F). At steps 518B and 520B, a difference is determined and evaluated between the garment's hip front circumference and the consumer's hip front circumference. For example, applying the equations above:

$$20.5-19=0.5$$

$$0<=0.5<=4*(19/35)$$

A match is found at step 520B.

Measurement filter 430 a proceeds to height comparisons. If any of the above steps did not match, then at step 522B, the garment and/or data is discarded.

Height Comparisons

In one embodiment, measurement filter 430 calculates the heights and ensures that any differences are greater than zero. Measurement filter 430 compares the consumer shoulder to hem (12H) minus the garment shoulder to hem (15H), which may be expresses in the following equation:

$$x=12Hc-15Hg$$

If the result (x) is greater than or equal to zero and less than or equal to the consumer knee height (17H) plus the desired garment length (33D) then measurement filter 430 processes the next data point, as illustrated by the following equation:

If $(0<=x<=17Hc-33Dg)$ then proceed to next data point

Otherwise, measurement filter 430 discards the current garment into Bin D and proceeds to assess the next garment, if any. A flowchart 500C of these calculations is depicted in FIG. 5C.

Figure 5C:
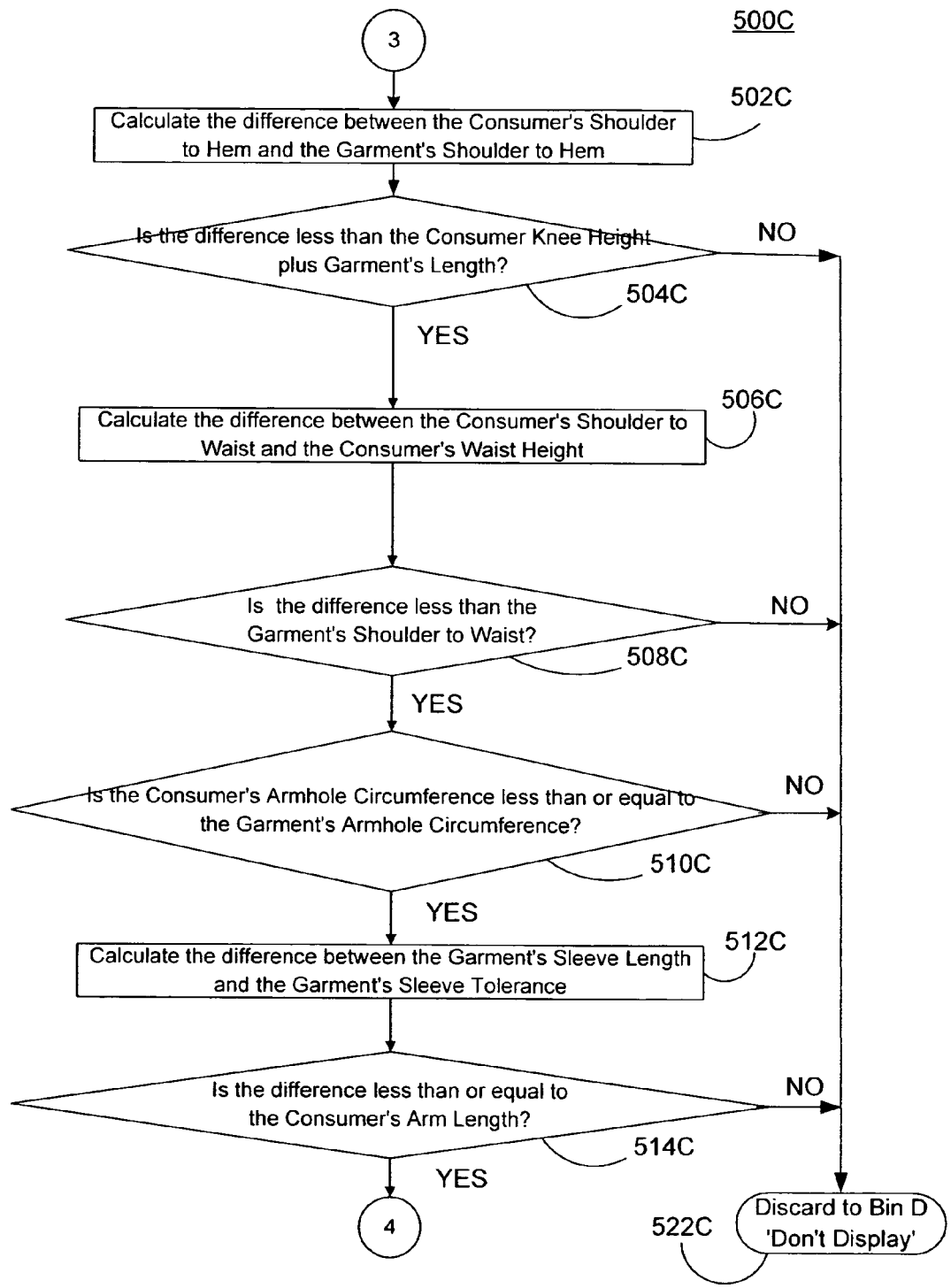

Referring FIG. 5C and to data in Tables 5 and 6, Jane's shoulder to hem is 53, and the dress' shoulder to hem is 38.75. At step 502C, a difference is determined between the consumer Jane shoulder to hem and the garment's shoulder to hem. For example, applying the above equations:

$$53-38.75=14.5$$

At step 504C, the difference calculated is evaluated. For example, when Jane's knee height is 17 and the dress' desired length is 0.

$$0<=14.5<=17+0$$

A match is found at step 504C, and measurement filter 430 may proceed to shoulders to waist (12H).

In one embodiment, at step 506C, measurement filter 430 calculates the difference between consumer shoulder height (12H) and consumer waist height (14H), which may be illustrated as the following equation:

$$x=12Hc-14Hc$$

If at step 508C, the result (x) is greater than or equal to zero and less than or equal to the garment shoulder to waist (12H) then measurement filter 430 processes the next data point at step 510C. Step 508C may be expressed using the following equation:

If $(0<=x<=12Hg)$ then proceed to next data point

Otherwise, measurement filter 430 proceeds to step 522C and discards the current garment into Bin D and proceeds to assess the next garment, if any. At steps 506C and 508C, referring to data in Tables 5 and 6 and the applying the above equations:

$$53-39=14$$

$$0<=14<=16.5$$

A match is found at step 508C.

Measurement filter 430 may proceed to process sleeve comparisons at step 512C.

Sleeve Comparisons

At step 510C, If measurement filter 430 determines that the consumer armhole circumference (19D) is less than or equal to the garment armhole circumference (21D) then measurement filter 430 proceeds to the next data point. Step 510C may be illustrated by the following formula:

If $19Dc<=21Dg$ then proceed to next data point

Otherwise, measurement filter 430 proceeds to step 522C and discards the current garment into Bin D and proceeds to assess the next garment, if any.

Referring to data in Tables 5 and 6, Jane's armhole circumference is 18, and the dress' is 20. At step 510C, applying the equations above:

$$18<=20$$

a match is found.

Measurement filter 430 proceeds to sleeve length (23D). At steps 512C and 514C, if measurement filter 430 determines that the garment sleeve length (23D) minus the garment sleeve tolerance (34D) minus the consumer arm length (21D) is less than or equal to zero, measurement filter 430 proceeds to process profiles using profile filter 450, as described further below. Step 514C, may be illustrated in the following equation:

If $(23Dg-34Dg-21Dc<=0)$ then proceed to profile filter 450

Otherwise, measurement filter 430 proceeds to step 522C and discards the current garment into Bin D and move on to assess the next garment, if any. Referring to data in Tables 5 and 6, using the above equations, a match is found:

$$(22.75-3-20)<=0$$

and match assessment process 120 may proceed to process profiles using profile filter 450.

Profile Filter

Figure 5D:
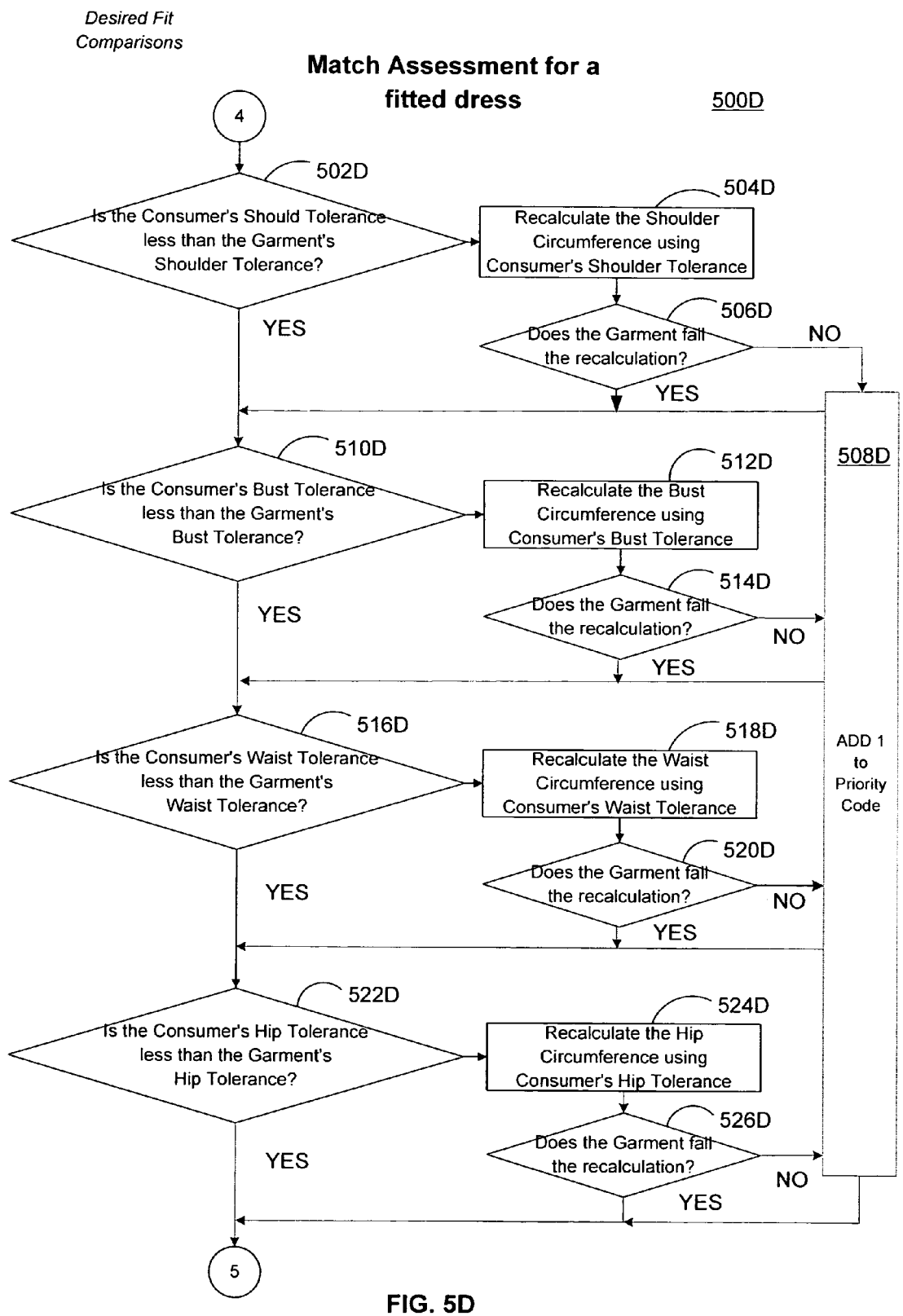

Referring now to FIG. 5D, in one embodiment, a garment's priority code is generally always zero. However, during match assessment process 110, the priority code may be temporarily given a numerical value. If a garment fails a comparison it is 'penalized' by having a number added to its priority code. The priority code determines the order in which garments are recommended and displayed to the consumer. In one embodiment, the higher a garment's priority code the less suitable it is for the consumer and the later (e.g., given less priority) it will be displayed to the consumer. A garment with a priority code of "1" will be recommended and appear before (e.g., given greater priority) a garment with a priority code of "5". In one embodiment, lower priority codes have a higher priority. For simplicity during the present example, a '1' is added to the priority code when a comparison fails. Note that the value of this penalty could be variable and weighted to a particular comparison. For example, failure to match a consumer's color preference may penalize a garment by 3, whereas its failure to match a consumer's fabric preference may only penalize it by 2.

In one embodiment, each consumer profile data point may be assigned a secondary value, referred to as an "importance value", to indicate its relative importance to the consumer. An importance value may be used to modify a corresponding penalty value, making it higher or lower depending upon how important that particular aspect of a garment is to the consumer. For example, Jane may feel that a garment's fabric is more important than its color. If so, Jane may give fabric an importance value of 2 and color an importance value of 1. Using these importance values to modify the earlier example, it is apparent the garment's color penalty remains 3 (3*1=3), while its fabric penalty jumps from 2 to 4 (2*2=4). For simplicity and clarity in the following examples, all consumer profile data are considered equally important with no importance values being assigned and no modification of penalty values being calculated.

Desired Fit Comparisons

Profile filter 450 compares the results of the circumference comparisons above with the consumer's desired shoulder tolerance, bust, waist and hips (1001D through 1004D). If profile filter 450 determines the consumer's desired tolerance is less than the garment tolerance, profile filter 450 modifies the circumference calculations by substituting the consumer's tolerance for the garment's tolerance. A flowchart 500D of these calculations is depicted in FIG. 5D.

For example, at step 502D if the consumer shoulder tolerance (1001D) is less than the garment shoulder tolerance (28D), then at step 504D, profile filter 450 reprocesses the shoulder circumference calculation by substituting the consumer's shoulder tolerance (1001D) for the garment's shoulder tolerance (28D). Therefore, applying the equations from above:

$$x=1Cg-1Cc$$

If at step 506D, $(0<=x<=28Dg)$ then proceed to next data point x becomes $$x=1Cg-1Cc$$

If at step 506D, $(0<=x<=1001Dc)$ then profile filter 450 processes the next data point Referring to FIG. 5D and data in Tables 5 and 6, Jane prefers a snug fit at her shoulders; she has a desired shoulder tolerance of only 1, which is less than the garment shoulder tolerance of 2 that we used in non-modified shoulder circumference comparison above. So, profile filter 450 substitutes Jane's value and recalculates the shoulder circumference:

37−36.5=0.5

0<=0.5<=1

Following steps 510D-522D, the match remains as Jane's bust, waist and hip tolerances (1002D-1004D) are not less than the corresponding garment tolerances (29D, 30D and 32D), so there is no need to recalculate those circumferences. However, had any one of the tolerances not passed, then as in step 504D and step 506D above, they would be recalculated and a "1" would be added to the priority code for each recalculation failure.

For example, at step 506D if a garment fails a circumference recalculations, then a "1" is added to the garment's priority code (123D) and match assessment process 120 proceeds to the profile comparisons. Since in this illustration the dress has passed the shoulder circumference, recalculation match assessment process 120 proceeds to the profile comparisons process with the priority code still equaling zero.

Profile Comparisons

Figure 5E:
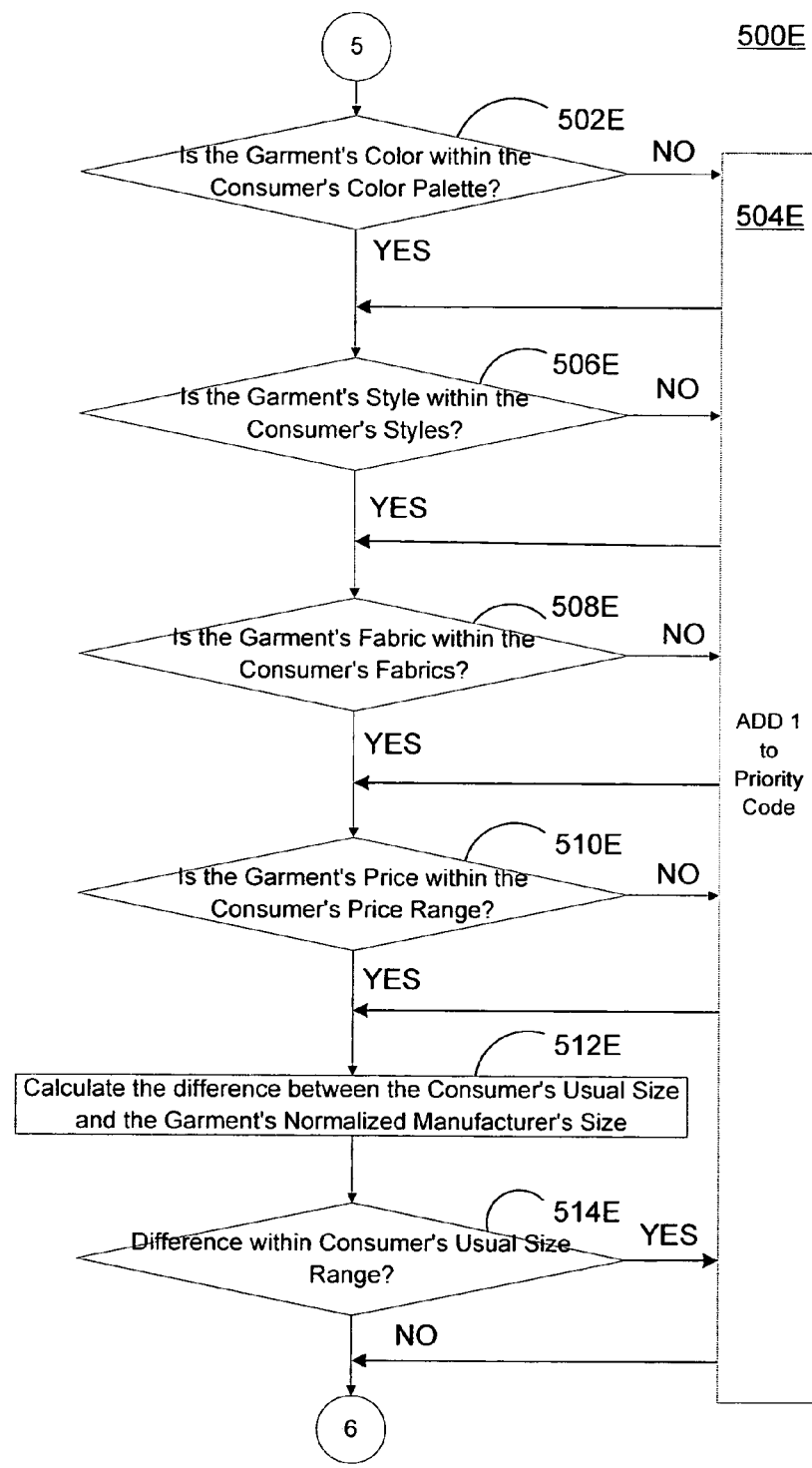

A flowchart 500E of the profile comparison calculations is depicted in FIG. 5E. Match assessment process 120 compares these four consumer and garment data points as follows:

At step 502E, If garment color (115*d*) is contained in the array of values in the consumer's color palette (1005*d*), and at step 506E, garment style (118*d*) is contained in the array of values in the consumer's desires styles (1006*d*), and at step 508E, garment fabric (119*d*) is contained in the array of values in the consumer's desired fabrics (1007*d*), and at step 510E, garment retail price (107*d*) is less than or equal to consumer's 'i usually spend' (1019*d*), then this garment is a match and its priority code is not changed.

Otherwise, match assessment process 120 proceeds to step 504E and adds 1 to the garment's priority code each time a comparison fails.

Referring to data in Tables 5 and 6, Jane's Color, style, fabric and price preferences all match. Match assessment process 120 proceeds to the size comparison still having a priority code of zero.

At step 514, match assessment process 120 compares the garment's manufacturer size (121D) with the consumer's usual size (1012D). This is an array of size values dependent on garment type. As noted above, manufacturers' sizes are notoriously variable from manufacture to manufacturer and even internally inconsistent. A manufacturer often has its own proprietary sizing scheme, e.g., "A" versus "10." So, a separate size lookup table (not shown here) is employed to normalize the garment's manufacturer size (121D) for use in the size comparison. Referring to our example data in Tables 5 and 6, the garment's manufacturer size (121D) is 1. The size lookup table illustrates the Leona Edmiston size 1 dress corresponds to a size 8. At step 512E, match assessment process 120 subtracts the normalized garment's manufacture's size from the consumer's usual size. If at step 514E, the difference is more than plus or minus 4 then match assessment process 120 adds 1 to the priority code. Step 514E may be expressed in the following equation:

If $((1012Dc-121Dg) > \pm4)$ then Priority Code=Priority Code+1

In this example, Jane's Usual Dress Size is 10 and the dress' normalized manufacture's Size is 8.

$((10-8) > \pm4)$ is FALSE

So this example dress is still a perfect match and its priority code is unchanged at zero.

Shape Code Filter

Figure 5F:
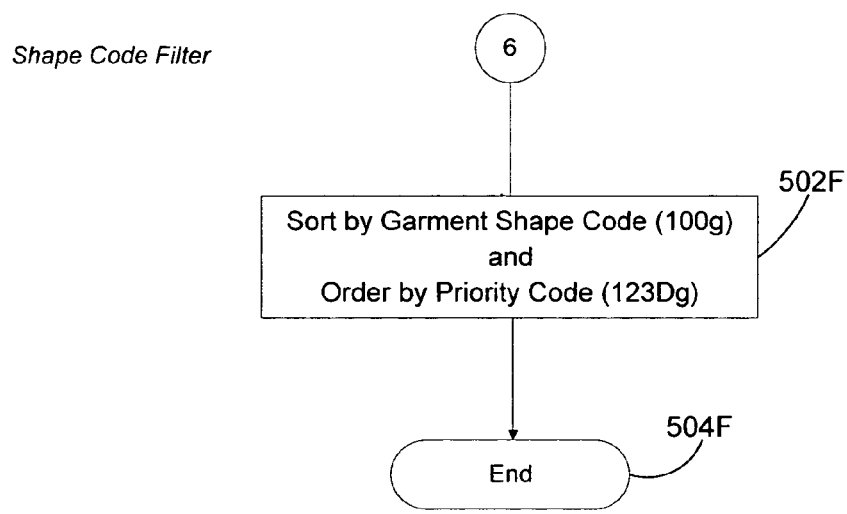

In one embodiment, a holding bin is employed for each body shape. As illustrated, embodiment there are seven holding bins: 1-7. Based on the Garment shape code (101) a garment is placed in its corresponding holding bin or bins. For example, a garment's shape code can be an array of numbers, e.g., 3,5,7. In this case it would be placed in Bins 3, 5 and 7. Once the garment's shape is assessed, match assessment process 120 proceeds to a match assessment of the next garment, if any. A flowchart of these calculations is depicted in FIG. 5*f*.

At step 502F, referring to example data in Tables 5 and 6, the dress' shape code is "1, 5". So, it will be placed in Holding Bins 1 and 5. This dress may be recommended to Jane as a BEST match as the dress shares Jane's shape code of 5 and has a priority code of zero. When finished, match assessment process 120 proceeds to step 504F and ends.

In some situations, multiple garments would be assessed in a single shopping session. As illustrated in FIG. 5G, when all garments have been subjected to match assessment process 120, they are sorted in ascending numeric order the contents of each holding bin 544 by the priority code of each garment in the bin. The garments are now segregated by shape code, and they are ordered from most suitable to least suitable. As illustrated, the garments may be displayed and recommended to the consumer those garments that are best matches. From the holding bin 544 that corresponds to the consumer's shape code (100*c*). In one process, those garments having a priority code of zero may be selected and displayed to the consumer. While, in this illustration, garments having a priority code of zero are the best matches, which are garments most likely to fit and suit the consumer, one skilled in the art will recognize that any priority code, symbol, flag, and the like, may used to label garments with the best match.

In one embodiment, the consumer may wish to consider garments that are less-than-perfect matches for her. If so, match assessment process 120 may fetch from her shape code's holding bin those garments having priority codes greater than zero, and may fetch and display them in order of suitability, according to priority code. The consumer may browse garments of a different body shape. In fact, the garments can be fetched, sorted and displayed in many ways, as will be described below.

The Personalized Shopping Process

Figure 6:
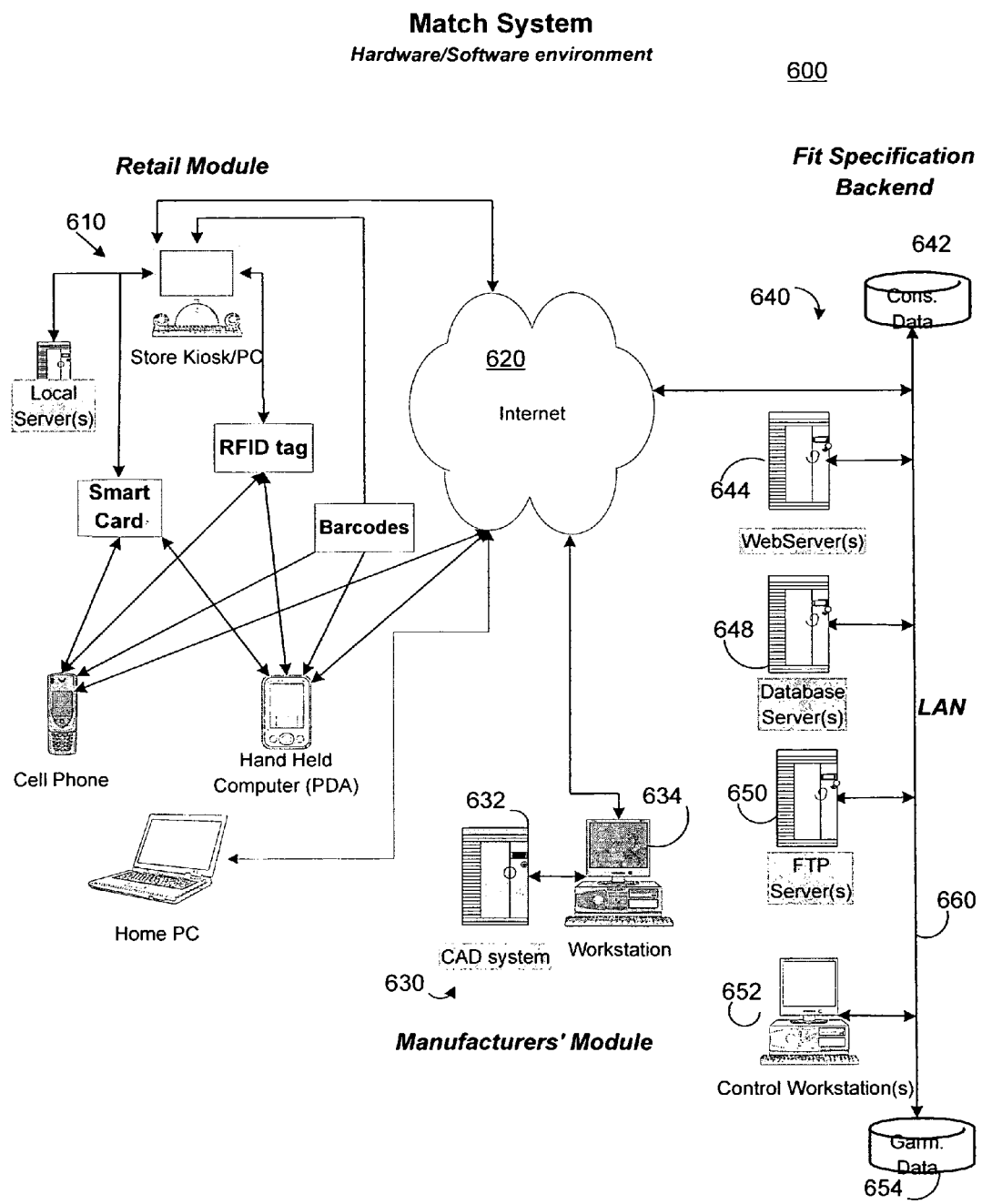
FIG. 6 is an illustration of a match system, in accordance with embodiments of the invention.

FIG. 6 depicts a match system 600 used to enable a shopping process. The shopping process allows the consumer accesses the categorization process 110 and match assessment process 120.

Consumer Categorization Process

In one embodiment, the personalized shopping process 130 and match system 600:

1. Measure a consumer's body.
2. Provide measurements to categorization process 110
3. Receive and processes consumer's shape code
4. Receive consumer's profile
5. Provide profile data to categorization process 110
6. Receive consumer's fit code Shop by Shape Code Once a Consumer knows her shape code, she may use the shape code to help select appropriate garments. She has several options for selecting the appropriate garments. For example, she can select garments in a 'bricks and mortar' retail store or may use an online shopping situation. She simply looks for a garment's shape code, printed on its 'hang tag' or label, and then compares its shape code to her own. Of course, she herself will have to assure that the garment's size is correct, but the shape code will give confidence that the garment is appropriate for her body shape.

Shop by Fit Code

If the consumer finds herself in an environment with access to match system 600 (embodiments of which are described below), she will be able to use her fit code and take advantage of the match assessment process 120. For example, she can: check how well a specific garment meets her needs, shop for garments of a certain type, or browse all types of garments. As the consumer's body measurements and preferences can, and will, change over time. Over time, she will want and need new clothes. Thus, the consumer will revisit the personalized shopping process 130 repeatedly.

Match System

Match system 600 is an implementation of fit specification process 100. In one embodiment the match system 600 is a computerized system, i.e., an assemblage of hardware and software for data processing and distribution. The system hardware may include, or be, a single or multiple computers, or a combination of multiple computing devices, including but not limited to: PCs, PDAs, cellphones, servers, firewalls, and routers. As used herein, the term software involves any instructions that may be executed on a computer processor of any kind.

The system software may be implemented in any computer language, and may be executed as object code, assembly, or machine code, or a combination of these and others. The software may include one or more modules, software, programs, and combinations thereof. The software may be in the form of one or more applications and suites and may include lower level drivers, object code, and other lower level software.

The software may be stored on and executed from any local or remote machine-readable medium such as, for example, without limitation, magnetic media (e.g., hard disks, tape, floppy disks, card media), optical media (e.g., CD, DVD), flash memory products (e.g., memory stick, compact flash and others), Radio Frequency Identification tags (RFID), SmartCards™, and volatile and non-volatile silicon memory products (e.g., random access memory (RAM), programmable read-only memory (PROM), electronically erasable programmable read-only memory (EEPROM), and others), and also on paper (e.g., printed UPC barcodes).

Match system 600 may make use of a network that may include web servers 644, file and application servers, as well as database servers 648, all operating in a networked environment that may include local area networks (LAN) 660, wide area networks (WAN) and the Internet 620. Data are transferred to match system 600 and among its components. This may be achieved in a conventional fashion employing the standard suite of TCP/IP protocols, including Hypertext Transfer Protocol (HTTP) and File Transfer Protocol (FTP) for the transfer of various data. The eXtensible Markup Language (XML), an interchange format for the exchange of data across the Internet and between databases of different vendors and different operating systems, may be employed to facilitate data exchange and inter-process communication.

Additional and fewer components, units, modules or other arrangement of software, hardware and data structures may be used to achieve the invention described herein.

Match system 600 includes several interconnecting areas: the fit specification backend 640, manufacturers' module 630, and retail module 610.

In one embodiment, fit specification backend 640 contains web servers 644, file server 650, database 648, and application servers 652 that house the primary location for categorization and match assessment software. Match system 600 also includes master databases of individual consumers' shape and fit codes 642 and individual garments' shape and fit codes 654.

The manufacturers' module 630 is the software/hardware that allows a manufacturer to obtain shape and fit codes for their goods. For example, for each garment of a particular size or SKU, a manufacturer enters the garment's dimensional measurements and profile data into the manufacturers' module. This data may be entered manually or automatically by interfacing via a workstation 634 for example, with the manufacturer's own internal systems, such as cad systems 632. The data is subjected to garment categorization engine 230, as described herein. This can occur locally or remotely through the fit specification backend 640. The manufacturer may now employ the resultant shape and fit codes in the manufacturing process; for example, to print and/or electronically embed the shape code(s) and fit code on the garment's labels, sales tags, RFID tags, etc.

The retail module 610 appears in two general areas: 'bricks and mortar' retail stores and online stores. Typically retail stores are located at malls, shopping centers, etc., while online stores are typically accessed via personal computers at home or office. The retail module 610 may also be accessed through kiosks, cellular phones, PDAs and other freestanding or networked devices. It is through the retail module 610 that a consumer can utilize the personalized shopping process. For example, Jane enters the women's Apparel section of a local department store. There she avails herself of the opportunity to receive her own personal shape and fit code. Her body measurements may be taken, e.g., automatically by means of a full body scanner. Her profile data is also collected and entered into the retail module 610, which may be a software/hardware package residing at the store, or on a network. The resultant shape and fit codes may be returned to Jane in a variety of forms, such as a printed receipt, a magnetic card, or a SmartCard™, etc.

In one embodiment, Jane obtains a printed card, die-cut with a distinctive curve representing her shape code. She may physically browse the store's stock using her shape code to find garments. She may also leverage her fit code and the match assessment process to locate in-store garments that fit her. Jane may do this by using the store's kiosks, her cellular phone, a PDA, or other portable computing devices. For example, Jane may have her shape and fit codes embedded in a SmartCard™. Similarly the Shape and Fit Codes of a blouse may be embedded in an RFID tag affixed to the blouse. A handheld computing device, such as PDA or cellular phone, may read Jane's SmartCard™ and the RFID tag and conduct a match assessment on the spot, either by having match assessment software embedded in the computing device, or by sending the fit code data to the Fit specification backend 640 and displaying the returned results. Accordingly, using such methods, Jane may spot-check individual garments she finds on the store's rack, or quickly locate garments in the store which fit her.

In another embodiment, the shape and fits codes may be associated with another number or code, such as an item ID.

For example, a manufacturer may use the item ID to look up garment information stored in a central database. The association may be used to link an arbitrary garment identifier, stored for example, in an RFID attached to the garment, with a shape and fit code stored in a database such as database 648.

Jill, on the other hand, prefers to shop from home or at the office. She accesses the retail module 140 via a PC and an online store. She, too, avails herself of the opportunity to receive her own personal shape and fit code. For example, following on-screen instructions she uses a tape measure to collect her body measurements and enters them into an online form. She also enters her profile information. This data is sent to fit specification backend 640 for processing. Jill's returned shape code is displayed to her. She may also receive an email containing her shape code and her fit code in a printable, machine-readable format, such as a barcode. Like Jane, the resultant shape and fit codes may be physically or electronically sent to Jill in a variety of forms, such as a printed receipt, a magnetic card, or a SmartCard™, etc. It may be forwarded to her cellular phone as a data file or an executable program. When shopping online Jill may access the retail module 610 directly, or it may be presented to her through an online store, which subscribes to the retail module as an world-wide-web service. By tapping the match assessment process for many garments, retail module 610 acts as clothing search engine.

Figure 7:
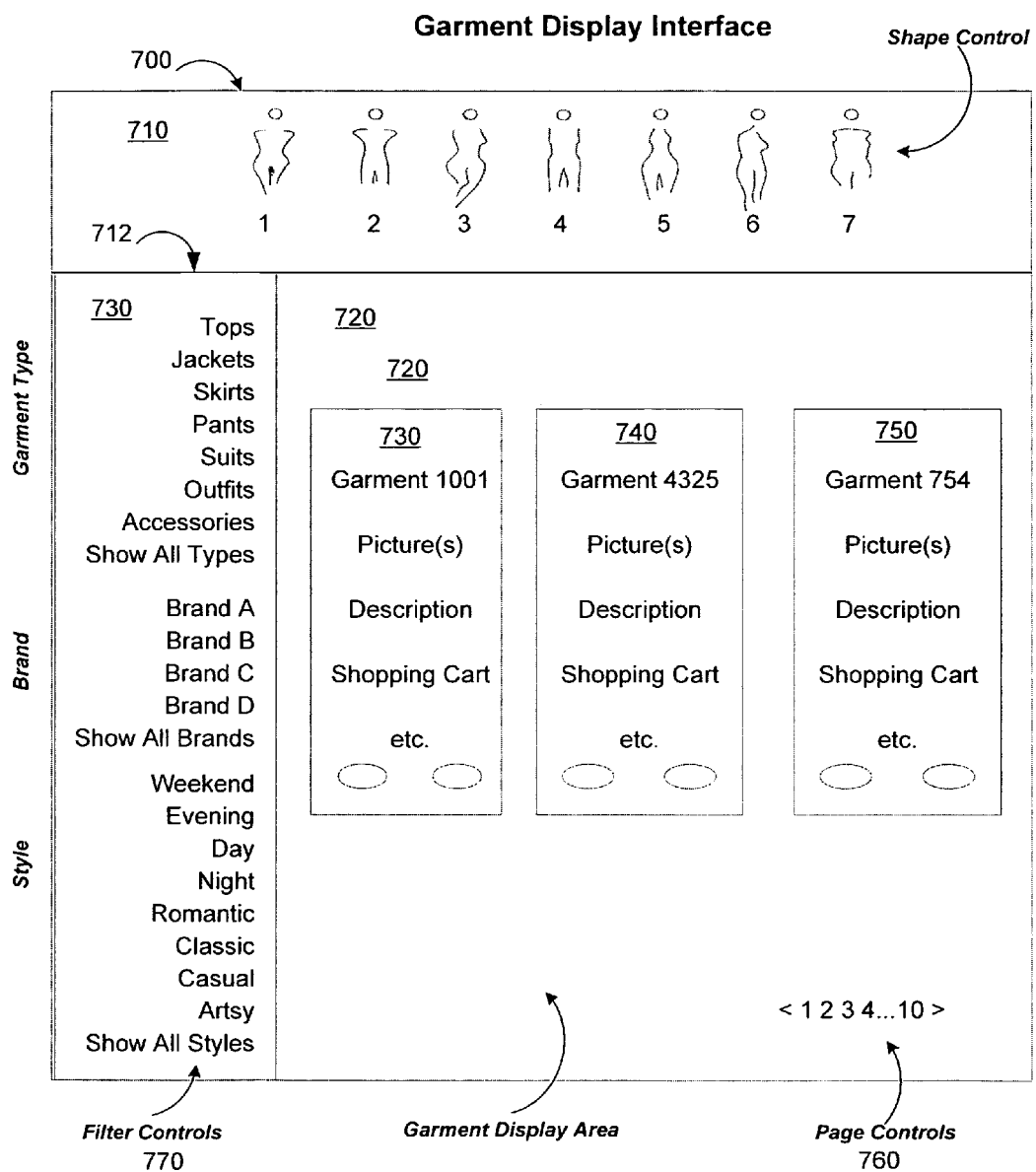
FIG. 7 is an illustration of a garment display interface, in accordance with embodiments of the invention.

In one embodiment, the results of a match assessment of multiple garments may be displayed to Jill using a graphical user interface (GUI) 700 as depicted in FIG. 7. This GUI interface 700 allows her to quickly view and filter the results of a match assessment query. Referring to FIG. 7, the shape control is a row 710 at the top depicting the seven body shapes of this embodiment. Clicking on a body shape selects a shape and the remainder of the page 712 is updated with garments matching that body shape. When the interface 700 is first displayed, the consumer's body shape may be automatically selected and the matching garments are displayed in page 712. Based upon the contents of the holding bins resulting from a match assessment as described herein, the garments may be displayed in the garment area 720. In one embodiment, the Priority Code assigned each garment may be used to determine their order of display. For example, BEST-fit garments, those with a Priority Code of zero, may be displayed first. The consumer may 'page' through the garments by selecting the page controls 760. A garment may be displayed with picture(s), descriptive text, ordering information, shopping cart buttons, etc. The results of a match assessment may also be emailed to Jane, delivered via cellular phone, PDA, physically mailed in the form of a personalized printed catalog, or delivered by any other means.

Additional filter controls 770 may be displayed. For example, a garment type (102Dg) filter lists the various types of matching garments, such as 'Dresses,' a brand (106Dg) Filter lists brands and designers, such as Leona Edmiston, a style (118Dg) filter lists clothing styles, such as 'Romantic.' In one embodiment, a filter could be displayed for any garment profile data point, such as color (115Dg), fabric (119Dg), sleeve style (112Dg), etc. For example, when a user selects a filter option, such as 'Jackets', interface 700 will show all matching garments that are jackets.

In other embodiments, multiple and discontiguous selections are contemplated using a "checkbox' style selection interface. For example, Jill may click 'Skirts, Pants, Brand A, Romantic, and Artsy.' The Garment Area may be updated with garments meeting all of those filter options.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of specifying a garment's fit, the method comprising:
   receiving dimensions for a garment;
   receiving garment profile data that identifies a style or manufacturer of the garment;
   determining a first garment categorization based on the garment's dimensions and the garment's profile data by categorizing the garments according to differences between body measurement data and the garment's dimensions according to predefined dimension variations; and
   comparing the first garment categorization to at least one consumer categorized with a second garment categorization to determine if there is a match.

2. The method of claim 1, wherein the garment's profile data comprises data describing the garment.

3. The method of claim 2, wherein the data describing the garment comprises at least one clothing fit tolerance, or clothing designer tolerance, or color tolerance, or clothing style tolerance, or clothing material tolerance, or use tolerance, or country of garment origin, or garment care, or garment brand.

4. The method of claim 1, wherein the garment's dimensions are based on computer design coordinates.

5. The method of claim 4, wherein the coordinates comprise three-dimensional coordinates that define one or more curves of a garment.

6. The method of claim 1, wherein comparing comprises filtering the first garment categorizations and the second garment categorizations to determine a garment presentation priority.

7. The method of claim 1, wherein the first garment categorization comprises at least one body fit code associated with at least one consumer body shape.

8. The method of claim 1, wherein the second garment categorization comprises a body fit code associated with the consumer.

9. A method of presenting a consumer with garments that fit the consumer's body, the method comprising:
   categorizing a plurality of human body shapes into a plurality of different body categories generated from a plurality of body dimensions and a plurality of consumer garment preferences;
   categorizing a plurality of garments into a plurality of garment categories generated from dimensions of the garments and a plurality of garment profiles by comparing the garments dimensions to the plurality of body dimensions to determine one or more body fit categories that the plurality of garments belong to; and
   identifying the garment categories that are within a tolerance range of respective body categories.

10. The method of claim 9, wherein categorizing the plurality of human body shapes comprises providing the tolerance range for each of the body categories.

11. The method of claim 9, further comprising presenting a consumer with garments that fit their body, or their preferences, or their body shape.

12. The method of claim 9, wherein the body categories comprise a plurality of different body fit codes.

13. The method of claim 9, wherein the garment categories comprise a plurality of different body fit codes.

* * * * *